(12) United States Patent
Cadesky

(10) Patent No.: US 10,912,315 B2
(45) Date of Patent: Feb. 9, 2021

(54) EDIBLE INSECT DERIVED PRODUCTS AND PROCESSES FOR THE MANUFACTURE AND USE THEREOF

(71) Applicant: C-FU FOODS INC., Toronto (CA)

(72) Inventor: Lee Cadesky, Toronto (CA)

(*) Notice: Subject to any disclaimer, the term of this patent is extended or adjusted under 35 U.S.C. 154(b) by 370 days.

(21) Appl. No.: 15/769,840

(22) PCT Filed: Oct. 21, 2016

(86) PCT No.: PCT/CA2016/051221
§ 371 (c)(1),
(2) Date: Apr. 20, 2018

(87) PCT Pub. No.: WO2017/066880
PCT Pub. Date: Apr. 27, 2017

(65) Prior Publication Data
US 2018/0310591 A1  Nov. 1, 2018

Related U.S. Application Data

(60) Provisional application No. 62/245,358, filed on Oct. 23, 2015, provisional application No. 62/245,386, filed on Oct. 23, 2015.

(51) Int. Cl.
*A23J 3/28* (2006.01)
*A23L 33/17* (2016.01)
(Continued)

(52) U.S. Cl.
CPC . *A23J 3/28* (2013.01); *A23J 3/04* (2013.01); *A23L 13/10* (2016.08); *A23L 33/17* (2016.08); *A23V 2002/00* (2013.01)

(58) Field of Classification Search
CPC ..... A23J 3/04; A23J 3/28; A23L 13/10; A23L 33/17; A23V 2002/00
See application file for complete search history.

(56) References Cited

U.S. PATENT DOCUMENTS

2015/0132433 A1   5/2015  Dossey
2015/0223508 A1*  8/2015  Arsiwalla ............... C11B 1/025
                                                  426/7

FOREIGN PATENT DOCUMENTS

CA    2877112 A1   12/2013
CA    2936068 A1    8/2014
(Continued)

OTHER PUBLICATIONS

Derwent Abstract for CN101836686 published Aug. 2012.*
(Continued)

*Primary Examiner* — Anthony J Weier

(57) ABSTRACT

Edible food protein products derived from insects, such as edible textured insect proteins, insect protein concentrates and insect whey protein concentrates, and processes to produce those products, are described. For example, described is a process for producing an edible protein product derived from at least one insect that comprises: processing the at least one insect to produce an insect milk by combining the at least one insect with an extraction buffer solution containing at least one of a monovalent salt, a divalent salt and a phosphate salt, and reducing the at least one insect into a plurality of insect particles of a desired particle size; adjusting a pH level of the insect milk; and heating the insect milk is to coagulate the insect milk to form whey and at least one curd. In some embodiments, the insect protein concentrates and insect whey protein concentrates are in powder form.

17 Claims, 14 Drawing Sheets

(51) Int. Cl.
*A23J 3/04* (2006.01)
*A23L 13/10* (2016.01)

(56) References Cited

FOREIGN PATENT DOCUMENTS

| | | | |
|---|---|---|---|
| CN | 1231131 | A | 10/1999 |
| CN | 1377898 | A | 11/2002 |
| CN | 1802983 | A | 7/2006 |
| CN | 101836686 | B | 8/2012 |
| RU | 2010150667 | A | 4/2013 |
| RU | 2557404 | * | 7/2015 |
| WO | 2013191548 | A1 | 12/2013 |
| WO | 2014123420 | A1 | 8/2014 |
| WO | 2016108033 | A1 | 7/2016 |

OTHER PUBLICATIONS

Derwent Abstract for CN1377898 published Nov. 2002.*
Yi, L, et al., "Extraction and characterization of protein fractions from five insect species", Food Chem., vol. 141(4), Jun. 6, 2013, pp. 3341-3348.
Open Bug Farm—A Tiny Farms Project, Blog Post, Feb. 2015 (online: http://www.openbugfarm.com/forum.html#/discussion/201/anyone-know-the-guys-behind-c-fu).
Chalamaiah, M., Dinesh Kumar, B., Hemalatha, R., & Jyothirmayi, T. (2012). Fish protein hydrolysates: Proximate composition, amino acid composition, antioxidant activities and applications: A review. Food chemistry, 135(4), pp. 3020-3038.
Garcés-Rimón, M., Sandoval, M., Molina, E., López-Fandiño, R., & Miguel, M. (2015). Egg protein hydrolysates: New culinary textures. International Journal of Gastronomy and Food Science, May 2, 2015, pp. 17-22.
Liceaga-Gesualdo, A., & Li-Chan, E. (1999). Functional properties of fish protein hydrolysate from herring (*Clupea harengus*). Journal of Food Science, 64(6), pp. 1000-1004.
Bhaskar, N., Modi, V., Govindaraju, K., Radha, C., & Lalitha, R. G. (2007). Utilization of meat industry by products: protein hydrolysate from sheep visceral mass. Bioresource technology, 98(2), pp. 388-394.
Chalamaiah, M., Rao, G. ft, Rao, D. G., & Jyothirmayi, T. (2010). Protein hydrolysates from meriga (*Cirrhinus mrigala*) egg and evaluation of their functional properties. Food Chemistry, 120(3), pp. 652-657.
Ghribi, A. M., Gafsi, I. M., Sila, A., Blecker, C., Danthine, S., Attia, H., Bougatef, A., & Besbes, S. (2015). Effects of enzymatic hydrolysis on conformational and functional properties of chickpea protein isolate. Food Chemistry, 187, pp. 322-330.
International Preliminary Report on Patentability (IPRP) for PCT/CA2016/051221, dated Apr. 24, 2018.
European Search Report for corresponding European application No. 16856527.3, dated Feb. 11, 2019.
Communication Pursuant to Article 94(3) From EP 16856527.3, Dated May 26, 2015, 5 Pages.

* cited by examiner

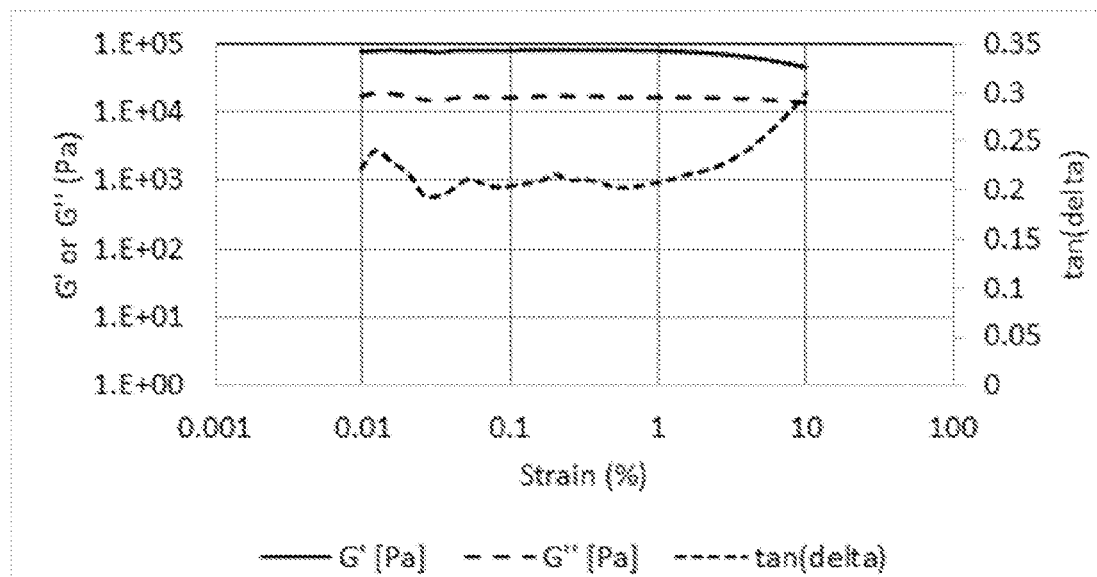
Figure 9A
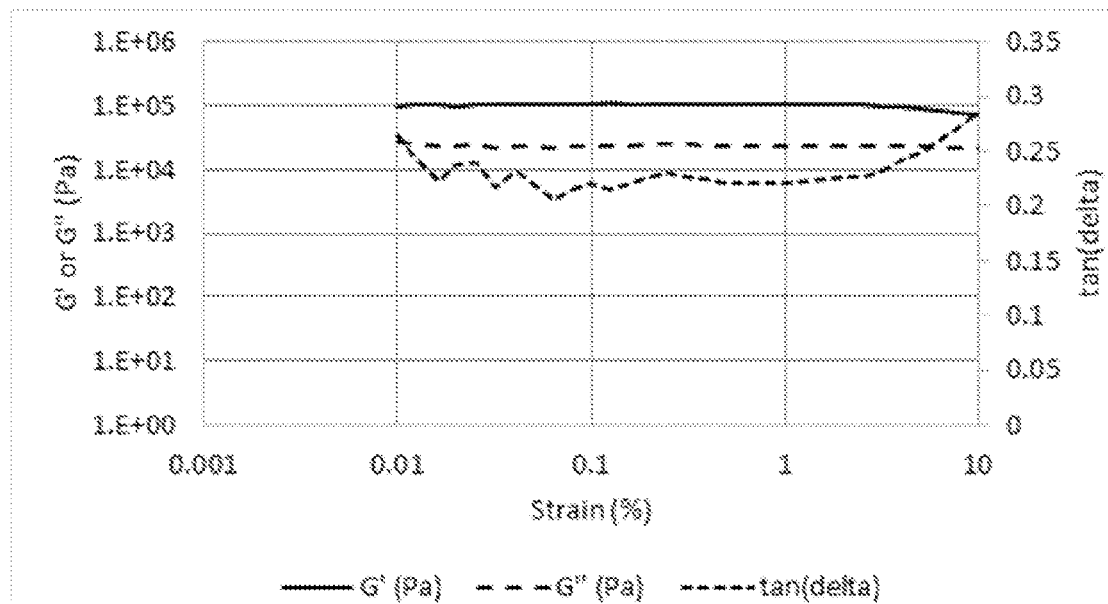
Figure 9B
| Test Setup | | |
|---|---|---|
| Instrument | ARES Rheometer | |
| Manufacturer | TA Instruments | |
| Fixture | Parallel plate | |
| Gap width | 0.75 | mm |
| Frequency | 1 | Hz |
| Temperature | 4 | C |
Figure 9C

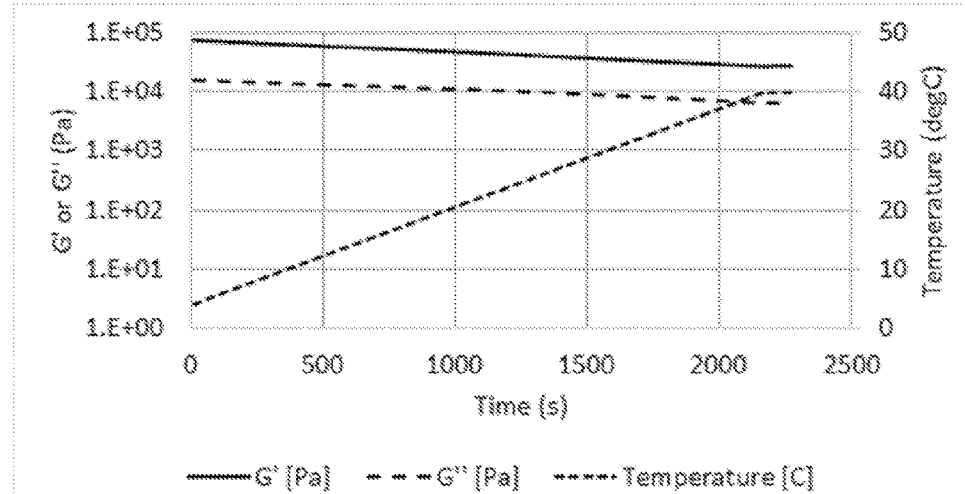
Figure 9D
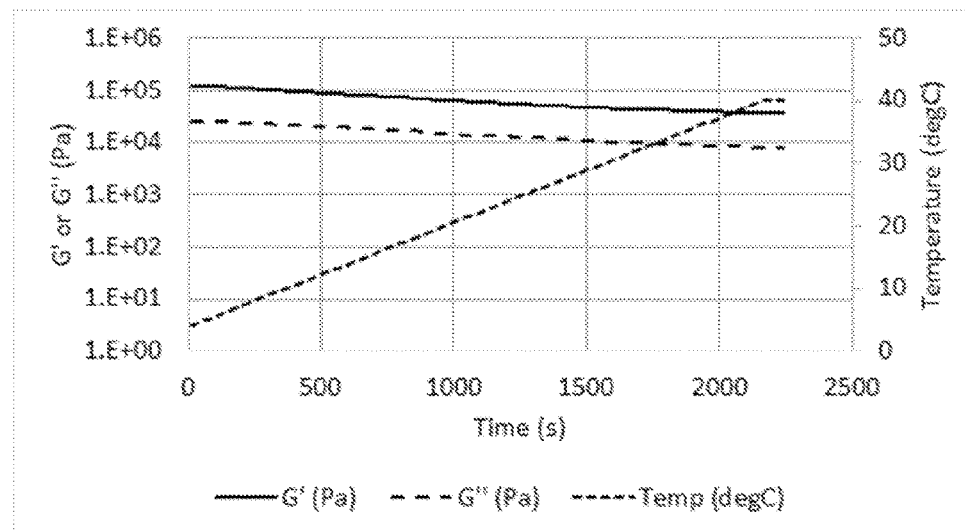
Figure 9E
| Test Setup | |
|---|---|
| Instrument | ARES Rheometer |
| Manufacturer | TA Instruments |
| Fixture | Parallel plate |
| Gap width | 0.75 mm |
| Frequency | 1 Hz |
| Strain | 1 % |
Figure 9F

EDIBLE INSECT DERIVED PRODUCTS AND PROCESSES FOR THE MANUFACTURE AND USE THEREOF

CROSS-REFERENCE TO RELATED APPLICATIONS

The present application claims priority from U.S. Provisional Patent Application No. 62/245,358 filed on Oct. 23, 2015 and U.S. Provisional Patent Application No. 62/245,386 filed on Oct. 23, 2015, the contents being incorporated herein by reference.

FIELD

The specification relates generally to edible protein products and processes for the manufacture thereof, and specifically to edible protein products derived from at least one insect, and processes for the manufacture thereof.

BACKGROUND

Insects are a regular source of protein for over 2 billion people worldwide and have been consumed by humans for millennia. Compared to conventional animal products, insects require significantly fewer inputs in the form of land, fresh water and feed. Insects emit substantially fewer greenhouse gases during their cultivation. Furthermore, insects may be cultivated on waste streams from other industries while delivering excellent nutrition and high quality protein. The increasing global population is creating a greater demand for food and protein; therefore, insects may become an important global foodstuff in the future.

At present, many insect based products are prepared using commercially available insect, or more commonly, cricket flours. These flours are made by roasting and grinding whole insects to produce a dry protein product used to fortify foods such as baked goods and energy bars. However, such cricket and insect flours are not stand-alone foods and must be added to existing foods to be used effectively. Known cricket flours also present numerous functionality challenges which make them poorly suitable to a wide range of applications including beverage fortification and the production of meat, dairy, and egg analogues. Furthermore, because of their poor solubility, known cricket flours, when used in beverages, usually require the use of stabilizers to maintain the solids in suspension.

Western consumer demand for insect protein flours, such as cricket flour, has increased in recent years. Currently, human food grade insects are expensive. Furthermore, current processes used to create insect protein flours/powders have yields ranging from about 23%-30%, greatly increasing the cost of insect protein flours. Therefore, there is a need for insect foodstuff processing methods that are efficient and inexpensive. There is moreover a need for new insect based ingredients that can function as meat, dairy, and egg replacers and enable new product development with insect protein.

Culturally influenced aversion may result in some consumers being unwilling to eat an insect-based product. Therefore, processes that can abstract insects into functional food ingredients with wide applications can be integral to consumer adoption. Furthermore, functional insect protein ingredients that can be used to create meat replacers that may be an important product to help reduce human consumption of environmentally damaging conventional animal products.

SUMMARY

Described herein are products and processes that, in at least some embodiments, represent improvements over published products and processes for the production of both insect protein powders and insect protein gels. Specific details of such these products and processes are presented further below.

According to a set of embodiments, there is provided a process for producing an edible protein product derived from at least one insect. The process comprises: processing the at least one insect to produce an insect milk by combining the at least one insect with an extraction buffer solution containing at least one of a monovalent salt, a divalent salt and a phosphate salt, and reducing the at least one insect into a plurality of insect particles of a desired particle size; adjusting the pH level of the insect milk; and heating the insect milk to coagulate the insect milk to form whey and at least one curd.

According to a related set of embodiments, the process further comprises adding at least one of a bulking agent, a protein concentrate, a protein isolate, an antioxidant and a gelling agent to the insect milk.

According to another set of embodiments, there is provided another process for producing an edible protein product derived from at least one insect. The process comprises: subjecting the at least one insect to a high hydrostatic pressure treatment to obtain at least one high hydrostatic pressure treated insect; and processing the at least one high hydrostatic pressure treated insect to produce a high hydrostatic pressure treated insect milk by combining the at least one high hydrostatic pressure treated insect with an extraction buffer solution containing at least one antioxidant, and reducing the at least one high hydrostatic pressure treated insect into a plurality of insect particles of a desired particle size.

According to a related set of embodiments, the process further comprises concentrating the high hydrostatic pressure treated insect milk by reducing a water content of the high hydrostatic pressure treated insect milk, thereby producing a high hydrostatic pressure treated insect milk protein concentrate.

According to another set of embodiments, there is provided another process for producing an edible protein product derived from at least one insect. The process comprises: processing the at least one insect to produce an insect milk by combining the at least one insect with an extraction buffer solution containing at least one antioxidant, and reducing the at least one insect into a plurality of insect particles of a desired particle size; and treating the insect milk with a proteolytic enzyme to hydrolyze proteins of the insect milk.

According to a related set of embodiments, the process further comprises, after the treating, concentrating the insect milk by reducing a water content of the insect milk, thereby producing an enzyme treated insect milk protein concentrate.

The following are example embodiments of the products and processes described herein. Any reference in these example embodiments to a series of example embodiments is to be understood as a reference to each of those example embodiments disjunctively (e.g., "Example Embodiments 1 to 4" or "Example Embodiments 1-4" is to be understood as "Example Embodiments 1, 2, 3 or 4").

Example Embodiment 1 is an edible textured insect protein product having storage modulus of at least about $10^4$ Pa over a temperature of about 4° C. to about 40° C.

Example Embodiment 2 is an edible textured protein product having a storage modulus of about $10^5$ Pa at about 4° C. over a range of strain values of about 0.01% to about 10%.

Example Embodiment 3 is an edible textured protein product having a peroxide value of less than about 10 meq/kg.

Example Embodiment 4 is an edible textured insect protein product substantially absent of exogenous gelling agents.

Example Embodiment 5 is an edible textured insect protein product having a protein content greater than 10%.

Example Embodiment 6 is the edible textured insect protein product of Example Embodiment 5, wherein the protein content is about 18%.

Example Embodiment 7 is the edible textured insect protein product of Example Embodiment 5, wherein the edible textured protein product has a protein content of about 21% and is fortified with about 20% pea protein isolate.

Example Embodiment 8 is an edible insect flour product comprised of a milled insoluble insect fraction of at least one insect and having a crude protein content of about 61%.

Example Embodiment 9 is an edible insect flour product comprised of a milled insoluble insect fraction of at least one insect having a crude protein content of about 62%.

Example Embodiment 10 is an edible insect whey protein concentrate having a soluble protein content of greater than about 39%.

Example Embodiment 11 is the edible insect whey protein concentrate according to Example Embodiment 10, wherein the insect whey protein concentrate is in powder form.

Example Embodiment 12 is an edible insect whey protein concentrate having a soluble protein content of greater than about 35%.

Example Embodiment 13 is the edible insect whey protein concentrate according to Example Embodiment 12, wherein the insect whey protein concentrate is in powder form.

Example Embodiment 14 is an edible insect whey protein concentrate having a protein content of about 30% and a fat content of less than about 2%.

Example Embodiment 15 is the edible insect whey protein concentrate according to Example Embodiment 14, wherein the insect whey protein concentrate is in powder form.

Example Embodiment 16 is an edible insect whey protein concentrate having a protein content greater than about 30%.

Example Embodiment 17 is the edible insect whey protein concentrate according to Example Embodiment 16, wherein the insect whey protein concentrate is in powder form.

Example Embodiment 18 is an edible insect whey protein concentrate that is generally non-turbid when suspended in water.

Example Embodiment 19 is the edible insect whey protein concentrate according to Example Embodiment 18, wherein the insect whey protein concentrate is in powder form.

Example Embodiment 20 is an edible insect whey protein concentrate that is generally non-turbid when suspended in water, wherein the insect whey protein concentrate is in a concentration of up to about 15%.

Example Embodiment 21 is the edible insect whey protein concentrate according to Example Embodiment 20, wherein the insect whey protein concentrate is in powder form.

Example Embodiment 22 is a process for producing an edible protein product derived from at least one insect, the process comprising: processing the at least one insect to produce an insect milk by combining the at least one insect with an extraction buffer solution containing at least one of a monovalent salt, a divalent salt and a phosphate salt, and reducing the at least one insect into a plurality of insect particles of a desired particle size; adjusting the pH level of the insect milk; and heating the insect milk to coagulate the insect milk to form whey and at least one curd.

Example Embodiment 23 is the process of Example Embodiment 22 further comprising: adding at least one of a bulking agent, a protein concentrate, a protein isolate, an antioxidant and a gelling agent to the insect milk.

Example Embodiment 24 is the process of Example Embodiment 23, wherein: the bulking agent comprises at least one of starch and maltodextrin; at least one of the protein concentrate and the protein isolate comprises at least one of a pea protein concentrate, a pea protein isolate, a faba bean concentrate, a cottonseed protein concentrate, a lentil protein concentrate, a whey protein concentrate, a whey protein isolate, a soy protein isolate, a soy protein concentrate, an egg white protein, a muscle protein concentrate and a muscle protein isolate; the antioxidant comprises a liposoluable antioxidant; and the gelling agent comprises a hydrocolloid.

Example Embodiment 25 is the process of Example Embodiment 24 wherein the liposoluable antioxidant is rosemary oil.

Example Embodiment 26 is the process of Example Embodiment 24 or Example Embodiment 25, wherein the hydrocolloid comprises at least one of agar agar, xanthan gum, locust bean gum, carob bean gum, tara gum, gum arabic, pectin, carboxymethylcelullose, alginate salts, and gelatin.

Example Embodiment 27 is the process of any one of Example Embodiments 22 to 26 further comprising: prior to the adjusting of the pH level, separating the insect milk into at least one of a fat fraction and a liquid fraction.

Example Embodiment 28 is the process of any one of Example Embodiments 22 to 27, wherein after the adjusting the pH level, the adjusted pH level of the insect milk is about 5 to about 9.

Example Embodiment 29 is the process of any one of Example Embodiments 22 to 27, wherein after the adjusting the pH level, the adjusted pH level of the insect milk is about 6.5 to about 7.1.

Example Embodiment 30 is the process of any one of Example Embodiments 22 to 27, wherein after the adjusting the pH level, the adjusted pH level of the insect milk is about 8 to about 9.

Example Embodiment 31 is the process of any one of Example Embodiments 22 to 30, wherein the extraction buffer solution contains the monovalent salt at a concentration of about 0.25 to about 2%.

Example Embodiment 32 is the process of any one of Example Embodiments 22 to 31, wherein the monovalent salt is one of sodium chloride and potassium chloride.

Example Embodiment 33 is the process of any one of Example Embodiments 22 to 30, wherein the extraction buffer solution contains the divalent salt at a concentration of about 0.25 to about 2%.

Example Embodiment 34 is the process of any one of Example Embodiments 22 to 30 and 33, wherein the divalent salt is one of calcium chloride, magnesium chloride, magnesium sulfate, calcium sulfate, calcium lactate and magnesium lactate.

Example Embodiment 35 is the process of any one of Example Embodiments 22 to 30, wherein the extraction buffer solution is one of acidic or alkaline.

Example Embodiment 36 is the process of Example Embodiment 35, wherein: when the extraction buffer solution is acidic, the extraction buffer solution has a pH level of about 2 to about 4; and when the extraction buffer solution is alkaline, the extraction buffer solution has a pH level of about 9 to about 12.

Example Embodiment 37 is the process of any one of Example Embodiments 22 to 36 further comprising: prior to the heating, filtering the insect milk to remove an insoluble fraction from the insect milk, wherein the insoluble fraction comprises chitin from the at least one insect.

Example Embodiment 38 is the process of any one of Example Embodiments 22 to 36 further comprising: applying an expelling pressure to the at least one curd to expel additional whey from the at least one curd and to form at least one curd of coarse textured insect protein.

Example Embodiment 39 is the process of Example Embodiment 37 further comprising applying an expelling pressure to the at least one curd to expel additional whey from the at least one curd and to form at least one curd of fine textured insect protein.

Example Embodiment 40 is the process of Example Embodiment 38 or Example Embodiment 39, wherein the expelling pressure is about 0.1 psi to about 100 psi.

Example Embodiment 41 is the process of Example Embodiment 38 or Example Embodiment 39, wherein the expelling pressure is about 0.1 psi to about 20 psi.

Example Embodiment 42 is the process of any one of Example Embodiments 38 to 41, wherein the applying the expelling pressure is performed using at least one of a hydraulic press, a pneumatic press and weighted plates.

Example Embodiment 43 is the process of any one of Example Embodiments 38 to 42 further comprising: after the applying the expelling pressure, milling, boiling and applying an additional expelling pressure to one of the at least one curd of coarse textured insect protein and the at least one curd of fine textured insect protein.

Example Embodiment 44 is the process of Example Embodiment 43, wherein the milling comprises milling the at least one curd of coarse textured insect protein or the at least one curd of fine textured insect protein in water in a ratio of curd to water of between about 2 to about 1.

Example Embodiment 45 is the process of Example Embodiment 43, wherein the milling comprises milling the at least one curd of coarse textured insect protein or the at least one curd of fine textured insect protein in water in a ratio of curd to water of between about 1 to about 10.

Example Embodiment 46 is the process of any one of Example Embodiments 22 to 37 further comprising: after the heating, filtering the insect milk to separate the whey from the at least one curd.

Example Embodiment 47 is the process of Example Embodiment 46 further comprising pasteurizing the whey to produce pasteurized whey.

Example Embodiment 48 is the process of Example Embodiment 47, wherein the pasteurizing is performing using at least one of a heat exchanger or a vat.

Example Embodiment 49 is the process of Example Embodiment 48, wherein the pasteurizing comprises pasteurizing the whey at about 72° C. for about 15 seconds.

Example Embodiment 50 is the process of any one of Example Embodiments 47 to 49 further comprising: concentrating the pasteurized whey by reducing a water content of the pasteurized whey to produce an insect whey protein concentrate.

Example Embodiment 51 is the process of Example Embodiment 50, wherein the concentrating comprises performing at least one of: open boiling, vacuum evaporation and reverse osmosis.

Example Embodiment 52 is the process of Example Embodiment 50 or Example Embodiment 51, wherein the solids content of the insect whey protein concentrate is about 8% to about 55% solids.

Example Embodiment 53 is the process of Example Embodiment 50 or Example Embodiment 51, wherein the solids content of the insect whey protein concentrate is about 18% to about 55% solids.

Example Embodiment 54 is the process of Example Embodiment 50 or Example Embodiment 51, wherein the solids content of the insect whey protein concentrate is about 21% solids.

Example Embodiment 55 is the process of any one of Example Embodiments 50 to 54 further comprising: drying the insect whey protein concentrate to produce an insect whey protein concentrate powder.

Example Embodiment 56 is the process of Example Embodiment 37 further comprising: drying the insoluble fraction; and milling the insoluble fraction after the drying to produce an edible insect flour.

Example Embodiment 57 is the process of any one of Example Embodiments 22 to 56, wherein the heating comprises heating the insect milk to a temperature of about 60° C. to 100° C.

Example Embodiment 58 is the process of any one of Example Embodiments 22 to 56, wherein the heating comprises heating the insect milk to a temperature of about 85° C. to 100° C.

Example Embodiment 59 is the process of any one of Example Embodiments 22 to 56, wherein the heating comprises heating the insect milk to a temperature of about 65° C. to 90° C.

Example Embodiment 60 is the process of any one of Example Embodiments 22 to 59, wherein the at least one insect comprises at least one of a cricket, a mealworm, a black soldier fly larvae and a wax moth larvae.

Example Embodiment 61 is an edible insect protein concentrate having a soluble protein content greater than about 35%, wherein the edible insect protein concentrate comprises high hydrostatic pressure treated insect milk.

Example Embodiment 62 is an edible insect protein concentrate having a protein content greater than about 30%, wherein the edible insect protein concentrate comprises high hydrostatic pressure treated insect milk.

Example Embodiment 63 is an edible insect protein concentrate having a protein content greater than about 50%, wherein the edible insect protein concentrate comprises high hydrostatic pressure treated insect milk.

Example Embodiment 64 is an edible insect protein concentrate having a protein solubility greater than 35%, wherein the edible insect protein concentrate comprises high hydrostatic pressure treated insect milk.

Example Embodiment 65 is an edible insect protein concentrate having a soluble protein content greater than about 35%, wherein the edible insect protein concentrate comprises enzyme treated insect milk.

Example Embodiment 66 is an edible insect protein concentrate having a protein content greater than about 30%, wherein the edible insect protein concentrate comprises enzyme treated insect milk.

Example Embodiment 67 is an edible insect protein concentrate having a protein content greater than about 50%, wherein the edible insect protein concentrate comprises enzyme treated insect milk.

Example Embodiment 68 is an edible insect protein concentrate having a protein solubility greater than about 35%, wherein the edible insect protein concentrate comprises enzyme treated insect milk.

Example Embodiment 69 is a process for producing an edible protein product derived from at least one insect, the process comprising: subjecting the at least one insect to a high hydrostatic pressure treatment to obtain at least one high hydrostatic pressure treated insect; and processing the at least one high hydrostatic pressure treated insect to produce a high hydrostatic pressure treated insect milk by combining the at least one high hydrostatic pressure treated insect with an extraction buffer solution containing at least one antioxidant, and reducing the at least one high hydrostatic pressure treated insect into a plurality of insect particles of a desired particle size.

Example Embodiment 70 is the process of Example Embodiment 69, wherein the high hydrostatic pressure treatment comprises subjecting the at least one insect to a treatment pressure of about 250 MPa to about 450 MPa.

Example Embodiment 71 is the process of Example Embodiment 70, wherein the treatment pressure is applied for about 5 to about 15 minutes.

Example Embodiment 72 is the process of any one of Example Embodiments 69 to 71 further comprising: filtering the high hydrostatic pressure treated insect milk to remove an insoluble fraction from the high hydrostatic pressure treated insect milk, wherein the insoluble fraction comprises chitin from the at least one high hydrostatic pressure treated insect.

Example Embodiment 73 is the process of any one of Example Embodiments 69 to 72 further comprising: pasteurizing the high hydrostatic pressure treated insect milk.

Example Embodiment 74 is the process of any one Example Embodiments 69 to 73 further comprising: concentrating the high hydrostatic pressure treated insect milk by reducing a water content of the high hydrostatic pressure treated insect milk, thereby producing a high hydrostatic pressure treated insect milk protein concentrate.

Example Embodiment 75 is the process of Example Embodiment 74, wherein the concentrating comprises performing at least one of: open boiling, vacuum evaporation and reverse osmosis.

Example Embodiment 76 is the process of Example Embodiment 74 or Example Embodiment 75, wherein the solids content of the high hydrostatic pressure treated insect milk protein concentrate is about 8% to about 55% solids.

Example Embodiment 77 is the process of Example Embodiment 74 or Example Embodiment 75, wherein the solids content of the high hydrostatic pressure treated insect milk protein concentrate is about 18% to about 55% solids.

Example Embodiment 78 is the process of any one of Example Embodiments 74 to 77, wherein the solids content of the high hydrostatic pressure treated insect milk protein concentrate is about 21% solids.

Example Embodiment 79 is the process of any one of Example Embodiments 74 to 78 further comprising: drying the high hydrostatic pressure treated insect milk protein concentrate to produce a high hydrostatic pressure treated insect milk concentrate powder.

Example Embodiment 80 is the process of Example Embodiment 79, wherein the drying comprises performing at least one of: drum drying, freeze drying, spray drying, tray drying and refractance window drying.

Example Embodiment 81 is the process of any one of Example Embodiments 69 to 80, wherein the extraction buffer solution has a pH level of about 9 to about 12 and further comprises water and an alkylating agent.

Example Embodiment 82 is the process of Example Embodiment 72 further comprising: drying the insoluble fraction; and milling the insoluble fraction after the drying to produce an edible high hydrostatic pressure treated insect flour Example Embodiment 83 is the process of any one of Example Embodiments 69 to 82, wherein the at least one insect comprises at least one of a cricket, a mealworm, a black soldier fly larvae and a wax moth larvae.

Example Embodiment 84 is a process for producing an edible protein product derived from at least one insect, the process comprising: processing the at least one insect to produce an insect milk by combining the at least one insect with an extraction buffer solution containing at least one antioxidant, and reducing the at least one insect into a plurality of insect particles of a desired particle size; and treating the insect milk with a proteolytic enzyme to hydrolyze proteins of the insect milk Example Embodiment 85 is the process of Example Embodiment 84 wherein the proteolytic enzyme comprises at least one of an acidic, neutral, or alkaline protease.

Example Embodiment 86 is the process of any one of Example Embodiment 84 or Example Embodiment 85, wherein the proteolytic enzyme is at least one of ficin, papain, bromelain, subtilisin, trypsin, chymotrypsin and pepsin.

Example Embodiment 87 is the process of any one of Example Embodiments 73 to 86 further comprising: prior to the treating the insect milk with the proteolytic enzyme, adjusting a pH level of the insect milk.

Example Embodiment 88 is the process of Example Embodiment 87, wherein the adjusting the pH level of the insect milk comprises adjusting the pH level to about 5 to about 9.

Example Embodiment 89 is the process of Example Embodiment 87, wherein the adjusting the pH level of the insect milk comprises adjusting the pH level to about 7.

Example Embodiment 90 is the process of any one of Example Embodiments 84 to 89, wherein the treating the insect milk comprises heating the insect milk to about 40° C. to about 60° C.

Example Embodiment 91 is the process of any one of Example Embodiments 84 to 90, wherein the treating comprises hydrolyzing the proteins using the proteolytic enzyme for a duration of about 2 minutes to about 60 minutes.

Example Embodiment 92 is the process of any one of Example Embodiments 84 to 90, wherein the treating comprises hydrolyzing the proteins using the proteolytic enzyme for a duration of about 5 to about 60 minutes.

Example Embodiment 93 is the process of any one of Example Embodiments 84 to 90, wherein the treating comprises hydrolyzing the proteins using the proteolytic enzyme for a duration of about 25 minutes.

Example Embodiment 94 is the process of any one of Example Embodiments 84 to 93 further comprising: filtering the insect milk to remove an insoluble fraction from the insect milk.

Example Embodiment 95 is the process of any one of Example Embodiments 84 to 94 further comprising: after the treating, separating the insect milk into at least one of a fat fraction of the insect milk and a liquid fraction of the insect milk.

Example Embodiment 96 is the process of any one of Example Embodiments 84 to 95 further comprising: after the treating, pasteurizing the insect milk.

Example Embodiment 97 is the process of any one of Example Embodiments 84 to 95 further comprising: after the treating, concentrating the insect milk by reducing a water content of the insect milk, thereby producing an enzyme treated insect milk protein concentrate.

Example Embodiment 98 is the process of Example Embodiment 97, wherein the concentrating comprises performing at least one of: open boiling, vacuum evaporation and reverse osmosis.

Example Embodiment 99 is the process of Example Embodiment 97 or Example Embodiment 98, wherein the solids content of the enzyme treated insect milk protein concentrate is about 18% to about 55% solids.

Example Embodiment 100 is the process of any one of Example Embodiments 97 to 99, wherein the solids content of the enzyme treated insect milk protein concentrate is about 21% solids.

Example Embodiment 101 is the process of Example Embodiment 97 or Example Embodiment 100, wherein the solids content of the enzyme treated insect milk protein concentrate is about 8% to about 55% solids.

Example Embodiment 102 is the process of any one of Example Embodiments 97 to 101 further comprising: drying the enzyme treated insect milk protein concentrate to produce an enzyme treated insect milk protein concentrate powder.

Example Embodiment 103 is the process of Example Embodiment 102, wherein the drying comprises performing at least one of: drum drying, freeze drying, spray drying, tray drying and refractance window drying.

Example Embodiment 104 is the process of any one of Example Embodiments 84 to 103, wherein the extraction buffer solution has a pH level of about 9 to about 12 and further comprises water and an alkylating agent.

Example Embodiment 105 is the process of any one of Example Embodiments 84 to 104, wherein the at least one insect comprises at least one of a cricket, a mealworm, a black soldier fly larvae and a wax moth larvae.

Example Embodiment 106 is the process of any one of Example Embodiments 84 to 105, wherein the combining comprises combining the at least one insect with the extraction buffer solution in a ratio of insect weight to extraction buffer solution weight of between about 2 to 1 and about 1 to 10.

Example Embodiment 107 is the process of any one of Example Embodiments 84 to 104, wherein the combining comprises combining the at least one insect with the extraction buffer solution in a ratio of insect weight to extraction buffer solution weight of between is about 2 to 3.

LIST OF ACRONYMS

BSFL—Black soldier fly larva
IPC—insect protein concentrate
IWPC—insect whey protein concentrate
meq—milliequivalent
MPa—megapascal
PPI—pea protein isolate
psi—pounds per square inch
TIP—textured insect protein

BRIEF DESCRIPTION OF THE FIGURES

For a better understanding of the various embodiments described herein and to more clearly show how they may be carried into effect, reference will now be made, by way of example only, to the accompanying drawings in which:

FIG. 9A depicts a chart of rheological data for fine mealworm TIP, particularly a strain sweep, according to a non-limiting embodiment;

FIG. 9B depicts a chart of rheological data for fine cricket TIP, particularly a strain sweep, according to a non-limiting embodiment;

FIG. 9C depicts a table of test set up instruments and parameters for the strain sweep depicted in FIG. 9A and the strain sweep depicted in FIG. 9B;

FIG. 9D depicts a chart of rheological data for fine mealworm TIP, particularly a temperature ramp over a temperature range from about 4 to about 40° C., according to a non-limiting embodiment;

FIG. 9E depicts a chart of rheological data for fine cricket TIP, particularly a temperature ramp over a temperature range from about 4 to about 40° C., according to a non-limiting embodiment; and FIG. 9F depicts a table of test set up instruments and parameters for the temperature ramp depicted in FIG. 9D and the temperature ramp depicted in FIG. 9E.

DETAILED DESCRIPTION

Figure 1:
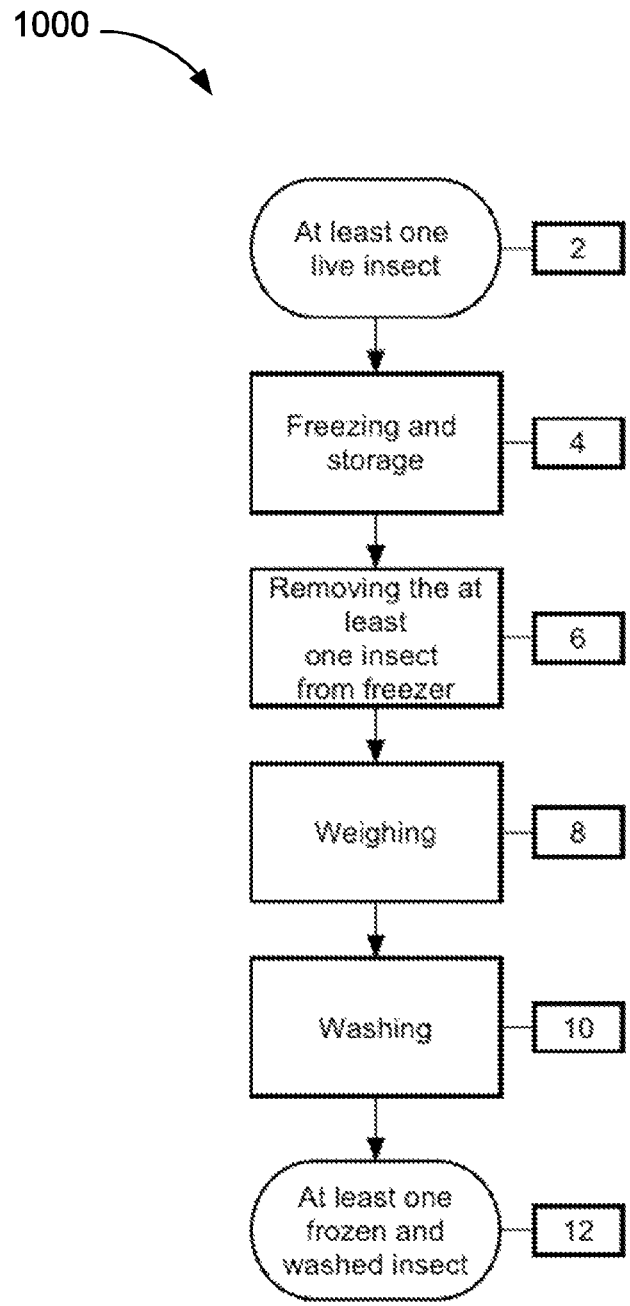
FIG. 1 is a process flow chart of a known and commonly applied insect pre-processing method.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XYY, YZ, ZZ, and the like).

As highlighted above, insect cultivation and insect use as a food source has a number of environmental advantages over traditional animal agriculture. Realizing the sustainable benefits that insects can provide requires displacing environmentally demanding foods such as dairy, meat and eggs. Unfortunately, known cricket flours do not have the functionality to replace conventional animal products as a stand-alone food. There is a need for insect based food products that can mimic the rheological and functional characteristics of meat, dairy, and eggs and products derived therefrom.

At present, insect protein fortified foods utilize cricket flours (or cricket powders) which have poor solubility and, therefore, limited application for use in a plethora of food products. Specifically, poor solubility negatively impacts texture, dispersibility, product development options, and product quality in beverage applications. Additionally, insect flours, as they are currently produced, lack functional properties common to food ingredients such as gelling, emulsification, foaming and whipping. Developing new processing methods that can improve protein solubility, and ultimately ingredient functionality, may enable new applications for insect protein powders and increase their use in the marketplace.

An important characteristic to the functionality of meat, dairy and egg is their ability to form gels. Many of the desirable sensorial attributes of meat, dairy and eggs come from protein networking, such as the thermal coagulation of an egg, or gelling and thickening of milk proteins to make yogurt. Thus, creating insect-based products that mimic the texture and functionality of conventional animal foods necessitates a method to extract and gel insect proteins. In doing so, the insect may be also visually abstracted from the consumer as the gelled product does not share a resemblance to whole insects. Furthermore, gelling enables applications for the insect protein as meat, dairy and egg replacements, and allows fine control of the final product rheology without introducing textural irregularities.

In the production of insect protein powders, at least some embodiments of the described products and processes represent several significant improvements over Canadian Patent Application No. 2,877,112. For example, in some embodiments, the overall hydrolysis time may be reduced. In some embodiments, the overall hydrolysis time is reduced from about 4-5 hours to about 25 minutes. Coagulation of proteins before or during spray drying in Canadian Patent Application No. 2,877,112 may lead to blockages in the spray dryer nozzle during processing that could reduce process output and possibly cause equipment damage. Described herein are methods that, in some embodiments, may prevent protein coagulation during processing, such as, high hydrostatic pressure treatment of the insects prior to processing and enzymatic treatment using an alkaline protease. In at least one embodiment, enzymatic hydrolysis may be used to prevent coagulation of proteins during concentration and spray drying, as well as to improve protein solubility and functionality.

In some embodiments, the enzymatic hydrolysis treatment described herein may be performed at about pH 7 to about pH 9 instead of about pH 6 to 8 as taught in CA 2,877,112. In some embodiments, commercial subtilisin may be used as the protease.

At least some of the embodiments of the products and processes described herein represent improvements over US20150132433 A1, "Insect Products and Method of Manufacture and Use Thereof". In contrast to US20150132433 A1, in some embodiments of the processes described herein, a protein concentrate powder is produced with improved solubility and which is protected from lipid oxidation through the use of antioxidants. Moreover, in some embodiments, the processes described herein hydrolyze insect protein which may prevent coagulation which improves the product solubility and prevents damage to the spray dryer nozzle during drying.

This application describes at least one process for the processing of food insects as a foodstuff. In some embodiments, it may simplify the known process by removing the need for centrifugation/decanting and reducing the number of product output streams from three to two. In some embodiments, a process for producing insect protein powders which may have high protein content and high solubility is described. In some embodiments, the described processes may have zero waste or near zero waste, with all product streams creating a usable food source. In some embodiments, the described insect protein concentrate powder taught may have levels of protein comparable with known cricket flours but with higher solubility, which may enable a wider range of applications, improved quality in formulations, and use in beverages and liquid products.

With regard to the production of insect protein based gels, described herein are products and processes that, in at least some embodiments, may represent improvements over the work developed in Yi, L. et al., "Extraction and characterization of protein fractions from five insect species," *Food Chem.*, vol. 141 (no. 4), 15 Dec. 2013, p. 3341-8 to create structured functional foods using insect proteins. The process published by Yi et al. 2013 may suffer from poor yield, gritty and uncohesive texture, and unacceptable discoloration after production. These shortcomings make the process ill-suited for mass production due to poor yields and may produce a product of inferior or unacceptable quality.

In some embodiments, the described herein are products which may have improved protein extraction due to the use of an alkaline buffer solution during the extraction process. In some embodiments, the products described herein have improved cohesion and gelling properties that may be attributable to inhibition of active enzymes by careful control of the pH and rapid heating to inactivate enzymes and stabilize the protein system. In yet further embodiments, the at least some of the products and processes described herein utilize sodium and phosphate salts to improve product texture, as well as calcium salts to alter protein structure leading to improved product texture. Improved gelling qualities may make this product more versatile and useable as a standalone food source and may result in a more cohesive product with a firmer texture.

Furthermore, flavors of a product described herein may be improved by the process of inhibiting active enzymes through careful control of pH and temperature. In some embodiments, discoloration may be inhibited by the process of this application. The careful control of the pH and use of thermal treatment to inactivate enzymes that is taught in this application may prevent discoloration and poor texture and yields in the final product. Finally, in at least some embodiments, the products and processes described herein exploit the use of antioxidants which may limit product rancidity and improve shelf-life.

In some embodiments, described herein is a process in which enzymatic color changes in edible gels that may cause gels to turn black or otherwise discolor in storage may be controlled. In some embodiments, the described processes may increase yield and/or result in a product production process that may reduce water consumption and create minimal waste. In some embodiments, described herein is a process for producing an insect protein food which may have improved texture and coagulation properties and a more cohesive texture over known insect-based products. In some embodiments, the process comprises concentrating a liquid byproduct ("whey") from the textured insect protein food production and drying the liquid byproduct to produce an insect whey protein concentrate which is high in protein, highly soluble, and has light color and low turbidity in suspension.

The present specification is generally directed to gelled edible insect foodstuffs (also referred to herein as "textured"), insect whey protein concentrates, and insect protein concentrates derived from insects. The gelled insect foodstuffs may be produced by varying methods to yield, in some embodiments, a fine or coarse textured product which may be used as a meat, dairy, or egg alternative. The insect whey protein concentrate and insect protein concentrate described herein are, in some embodiments, protein powders with high solubility which may be used to fortify a wide range of foods and beverages. In some embodiments, the edible insect products may be a good source of nutritional protein, essential fatty acids, vitamins, and minerals and have an improved texture and color over known insect products. In some embodiments, the edible insect product is a powder with good source of nutritional protein, essential fatty acids, vitamins, and minerals and has high solubility. Also described herein are examples of processes for producing such products.

Any suitable insects can be used with the processes and to produce the products described herein. The insects used may include arthropods and/or invertebrates. Non-limiting examples of suitable insects include: crickets, mealworms, wax moth larvae, superworms, silk worms, palm weevil larvae, black soldier fly larvae, fruit flies, grasshoppers, locusts, mopane caterpillars or combinations thereof. In one embodiment, mealworms are used. In another embodiment, wax moth larvae are used. In another embodiment, black soldier fly larvae are used. In yet another embodiment, crickets are used.

At least one insect may be prepared for processing using any suitable method. Attention is directed to referring to FIG. 1, which depicts a flow chart of an example process 1000 to prepare at least one insect for processing.

At least one live insect may be provided at Block 2. At Block 4, the at least one live insect or insects may be frozen until dead and stored frozen until required for processing. For example, the insects may be frozen at about −20° C. in a commercial freezer. At Block 6, the at least one insect that was frozen may be removed from the freezer. It may be helpful to weigh the at least one insect at Block 8 in preparation for future processing. The insects may be washed with cold, potable water, such as municipal, distilled or deionized water, at Block 10 to obtain at least one washed, frozen insect at Block 12 which may be reserved for further processing. Freeze dried insects may be substituted for washed frozen insects at Block 12 and in the subsequent Blocks. Drying the at least one insect using heat may not be a suitable method of preparing the at least one insect for processing since heat may denature the proteins. Denaturing the proteins may reduce the solubility of the proteins and prevent them from coagulating.

Figure 2A:
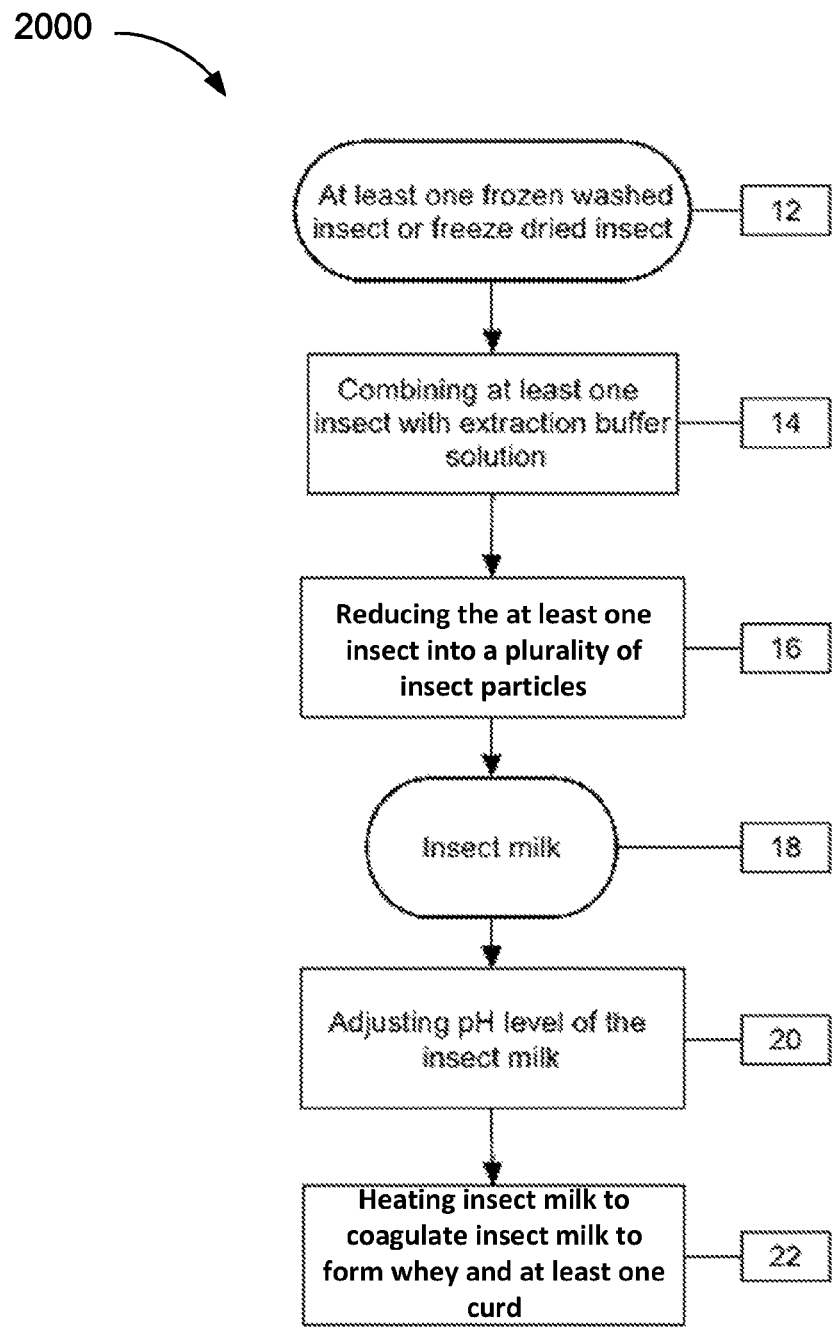
FIG. 2A is a flow chart illustrating a process of producing an edible protein product derived from at least one insect, according to a first set of non-limiting embodiments.

Attention is directed to FIG. 2A, which depicts a flowchart of a process 2000 for producing an edible protein product derived from at least one insect, according to a non-limiting embodiment. In particular, process 2000 will produce a textured insect protein product. It is to be emphasized that process 2000 need not be performed in the exact sequence as shown, unless otherwise indicated; and likewise various Blocks may be performed in parallel rather than in sequence; hence the elements of process 2000 are referred to herein as "Blocks" rather than "steps".

At least one insect, such as the at least one washed, frozen insect from Block 12, is processed to produce an insect milk (also referred to herein as "an insect protein suspension") at Block 18 by combining the at least one insect with an extraction buffer solution containing at least one of a monovalent salt, a divalent salt and a phosphate salt (Block 14), and reducing the at least one insect into a plurality of insect particles of a desired particle size (Block 16). The desired particle size may be any size of a particle of the at least one insect that is suitable for use with the processes and for the products described herein. In respect of the monovalent, divalent and phosphate salts any suitable food grade salts are contemplated. In some embodiments, the extraction buffer solution is neutral (about pH 7). In some embodiments, the extraction buffer solution is one of acidic or alkaline. When the extraction buffer solution is acidic, in some embodiments the extraction buffer solution may have pH level in a range of about 2 to about 4. When the extraction buffer solution is alkaline, in some embodiments the extraction buffer solution may have a pH level in a range of about 9 to about 12.

In some embodiments, the extraction buffer solution contains a monovalent salt at a concentration of about 0.25 to about 2%. In some embodiments, extraction buffer solution contains one of sodium chloride and potassium chloride as the monovalent salt. In some embodiments, the extraction buffer solution contains a divalent salt at a concentration of about 0.25 to about 2%. In some embodiments, extraction buffer solution contains one of calcium chloride, magnesium chloride, magnesium sulfate, calcium sulfate, calcium lactate and magnesium lactate as the divalent salt. In some embodiments, the extraction buffer solution contains more than one salt.

At Block 20, the pH level of the insect milk is adjusted. In some embodiments, the adjusted pH level of the insect milk is in a range of about 5 to about 9. In some embodiments, the adjusted pH level of the insect milk is in a range of about 6.5 to about 7.1. In some embodiments, the adjusted pH level of the insect milk is in a range of about 8 to about 9.

At Block 22, the insect milk is heated to coagulate the insect milk to form insect whey (also referred to herein as "whey") and at least one curd. In some embodiments, the insect milk is heated to a temperature in a range of about 60° C. to about 100° C. In some embodiments, the insect milk is heated to a temperature in a range is about 85° C. to about 100° C. In some embodiments, the insect milk is heated to a temperature in a range of about 65° C. to about 90° C.

Protein Extraction

Figure 2B:
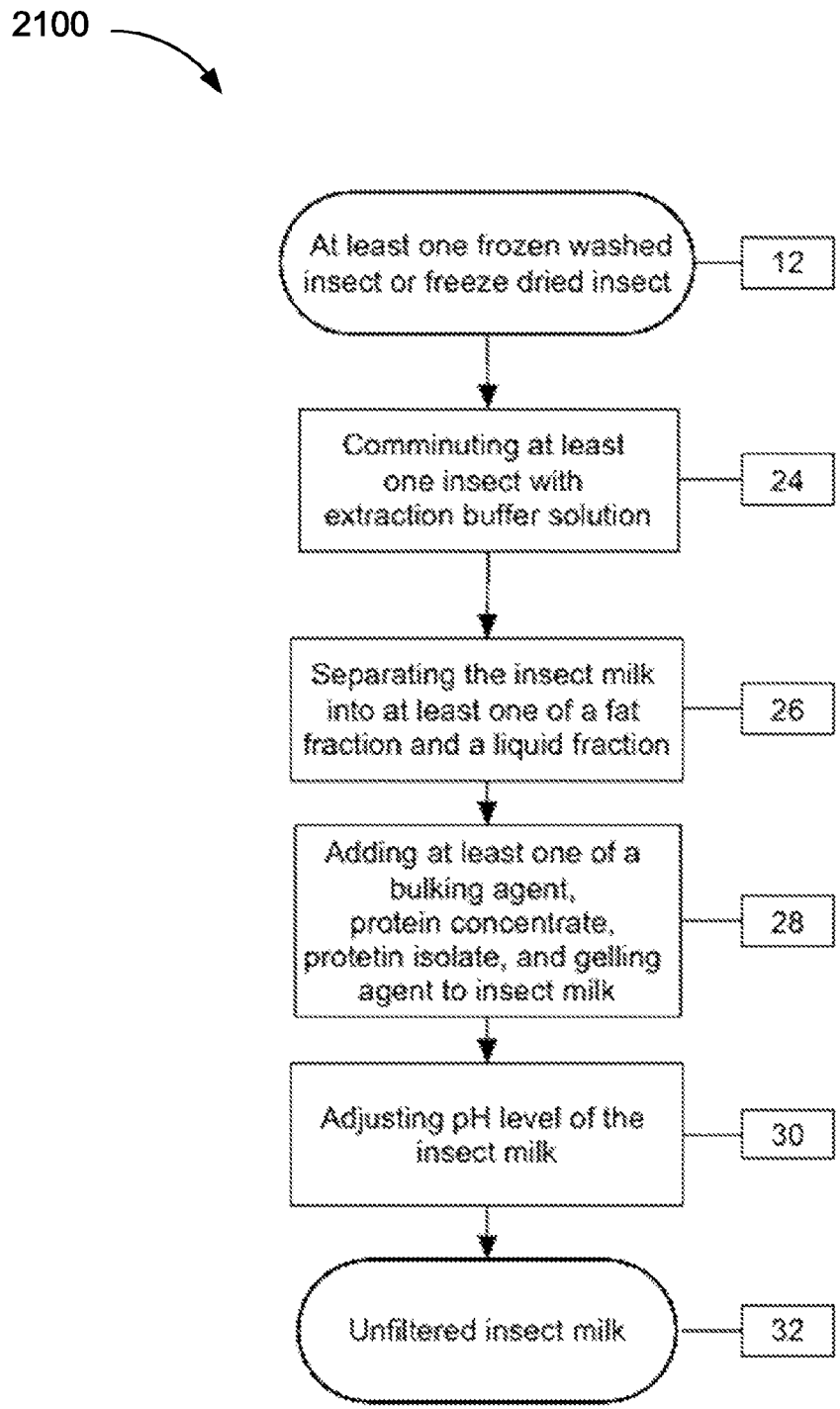
FIG. 2B is a flow chart illustrating a non-limiting example embodiment of aspects of the process illustrated in FIG. 2A.

FIG. 2B depicts a non-limiting example embodiment of some aspects of process 2000. For clarity, the process depicted in FIG. 2B will be referred to as "process 2100". The following discussion of process 2100 will lead to a further understanding of process 2000 and various aspects thereof. However, it is understood that process 2100 is only an example embodiment of aspects of process 2000 and can be varied, and that such variations are within the scope of the present specification. Furthermore, as in process 2000, process 2100 need not be performed in the exact sequence as shown, unless otherwise indicated; and likewise various Blocks may be performed in parallel rather than in sequence; hence the elements of process 2000 are referred to herein as "Blocks" rather than "steps".

At Block 24, at least one insect, such as the at least one washed, frozen insect from Block 12, is processed to produce an insect milk by combining the at least one insect with an extraction buffer solution containing at least one of a monovalent salt, a divalent salt and a phosphate salt, and reducing the at least one insect into a plurality of insect particles of a desired particle size. For example, the at least one insect may be first comminuted to obtain the desired particle size and the comminuted insect then combined with the extraction buffer solution. In some embodiments, the at least one insect may be first combined with the extraction buffer solution and then the at least one insect comminuted in the extraction buffer solution.

In some embodiments, the at least one insect may be comminuted with the extraction buffer solution at a ratio of insect weight to extraction buffer solution weight in a range of about 1:1 (about 1 to 1) and about 1:10 (about 1 to 10) w/w. In some embodiments, the ratio of insect weight to extraction buffer solution is about 1:2 (about 1 to 2). Comminution may be done using a blender, wet mill, or other suitable comminuting device or implement. In some embodiments, the at least one insect is comminuted with extraction buffer solution using an immersion blender. In some embodiments, the at least one insect is crushed using a press.

In some embodiments, the extraction buffer solution may be prepared using potable water, such as municipal, distilled or deionized water, to extract protein from the at least one insect. In some embodiments, an antioxidant may be added to the water to prevent rancidity. Examples of some suitable antioxidants that may be used, alone or in combination, include ascorbic acid, disodium ethylenediaminetetracetic acid (EDTA), dicalcium EDTA, rosemary oil, tocopherols, butylated hydroxytoluene (BHT), butylated hydroxyanisole (BHA) or citric acid, in concentrations of about 0.01 to about 2% mass/mass (w/w) depending upon the particular antioxidant(s) used. The extraction buffer solution may contain a salt or a combination of salts. Examples of some suitable salts that may be used, alone or in combination, are monovalent salts such as: sodium chloride, potassium chloride, or divalent salts like: calcium chloride, magnesium chloride, magnesium sulfate, calcium sulfate, calcium lactate, magnesium lactate, or other calcium or magnesium salts. In some embodiments, the monovalent salts are at a concentration in a range of about 0.05 to about 2.5%. When used to produce a textured insect protein product, the extraction buffer solution may contain phosphates to increase water holding of the final textured insect protein product. Examples of some suitable phosphates may include, alone or in combination, sodium tripolyphosphate, sodium pyrophosphate, sodium diphosphate, sodium monophosphate, or other phosphate salts at a concentration in a range of about 0.25 to about 1.5%. To increase protein extraction and improve gelling of the textured insect protein product, the extraction buffer solution may be alkylated using food grade alkali to a pH in a range of about 9 to about 12. In some embodiments, ascorbic acid at a concentration of about 0.075% w/w is used as an antioxidant. In some embodiments, ascorbic acid and citric acid each with a respective concentration of about 0.075% w/w are used. In some embodiments, sodium EDTA or dicalcium EDTA at a concentration of about 0.1% w/w is used. The extraction buffer solution may also contain salts to improve protein extraction and enhance protein gelation at other Blocks. In some embodiments, the extraction buffer solution contains sodium chloride at a concentration of about 0.75% w/w. In some embodiments, sodium chloride is used in the buffer at a concentration of about 1% w/w. The extraction buffer solution may also contain phosphate salts to increase water holding in the final gelled product. In one embodiment, sodium tripolyphosphate is included in the extraction buffer solution at a concentration of about 0.75%. In some embodiments, when used to produce a textured insect protein product, the extraction buffer solution contains: about 0.075% ascorbic acid (antioxidant), about 0.075% citric acid (antioxidant), about 0.75% sodium chloride, 1% calcium chloride and the buffer is alkylated using 6 M sodium hydroxide to a pH in a range of about 11.5 to about 12.2.

Performance of process 2100 yields an unfiltered insect protein suspension (also hereto referred to as "an unfiltered insect milk").

At Block 26, the insect milk can be separated into at least one of a fat fraction and a liquid fraction (also referred to herein as the "insect milk" after the separating). The insect milk may be separated by, for example, centrifugation using a centrifuge or by fractionation using a different fractionation technology like membrane filtration to separate fat from the insect milk. Separated fat may be added back to the insect milk to standardize the fat content. In some embodiments, the insect milk is not fractionated.

At Block 28, at least one of a bulking agent, a protein concentrate, a protein isolate, an antioxidant and a gelling agent may be added to the insect milk. In some embodiments, the antioxidant comprises rosemary oil, or another liposoluble antioxidant. In some embodiments the antioxidant is added at about 0.035% of the insect weight to the insect milk to help prevent rancidity. In some embodiments, at least one of a protein concentrate and a protein isolate is added to the insect milk to help increase yield and improve gelling properties. In some embodiments, at least one of the protein concentrate and the protein isolate is added in powder form. Some non-limiting examples of suitable protein isolates or protein concentrates are: a pea protein concentrate, a pea protein isolate, a faba bean concentrate, a cottonseed protein concentrate, a lentil protein concentrate, a whey protein concentrate, a whey protein isolate, a soy protein isolate, a soy protein concentrate, an egg white protein, a muscle protein concentrate and a muscle protein isolate. In some embodiments, the protein concentrates or protein isolates are added to the insect milk in a range of about 1 to about 100% of the insect weight. In some embodiments, pea protein isolate is added to the insect milk at about 20% of the insect weight. In some embodiments, bulking agents are added to the insect milk to help increase yield. Some non-limiting examples of suitable bulking agents are starches or maltodextrin. In some embodiments, gelling agents are added to the insect milk to improve gelling qualities and yield. Some non-limiting examples of suitable gelling agents are hydrocolloids, like agar agar, xanthan gum, locust bean gum, carob bean gum, tara gum, gum arabic, pectin, carboxymethylcelullose, alginate salts, and gelatin. If salts were not included in the extraction buffer solution they may be added to the insect milk at this stage or after centrifugation and standardization in the proceeding step. In some embodiments, no bulking agents, gelling agents, protein isolate or protein concentrate is added to the insect milk.

At Block 30, the insect milk pH is adjusted. For example, the pH of the insect milk, such as the liquid fraction, may be adjusted using food-grade acid or alkali. In some embodiments, the pH level of the insect milk is adjusted to a pH in a range of about 5 to about 9. In some embodiments, the insect milk is alkylated using about 6 M sodium hydroxide to a pH level in a range of about 6.9 to about 7.1. At Block 32, unfiltered insect milk is obtained. However, in some embodiments of process 2000, the insect milk may be filtered to produce filtered insect milk (for example, as shown at Block 46 of FIG. 2C).

Figure 2C:
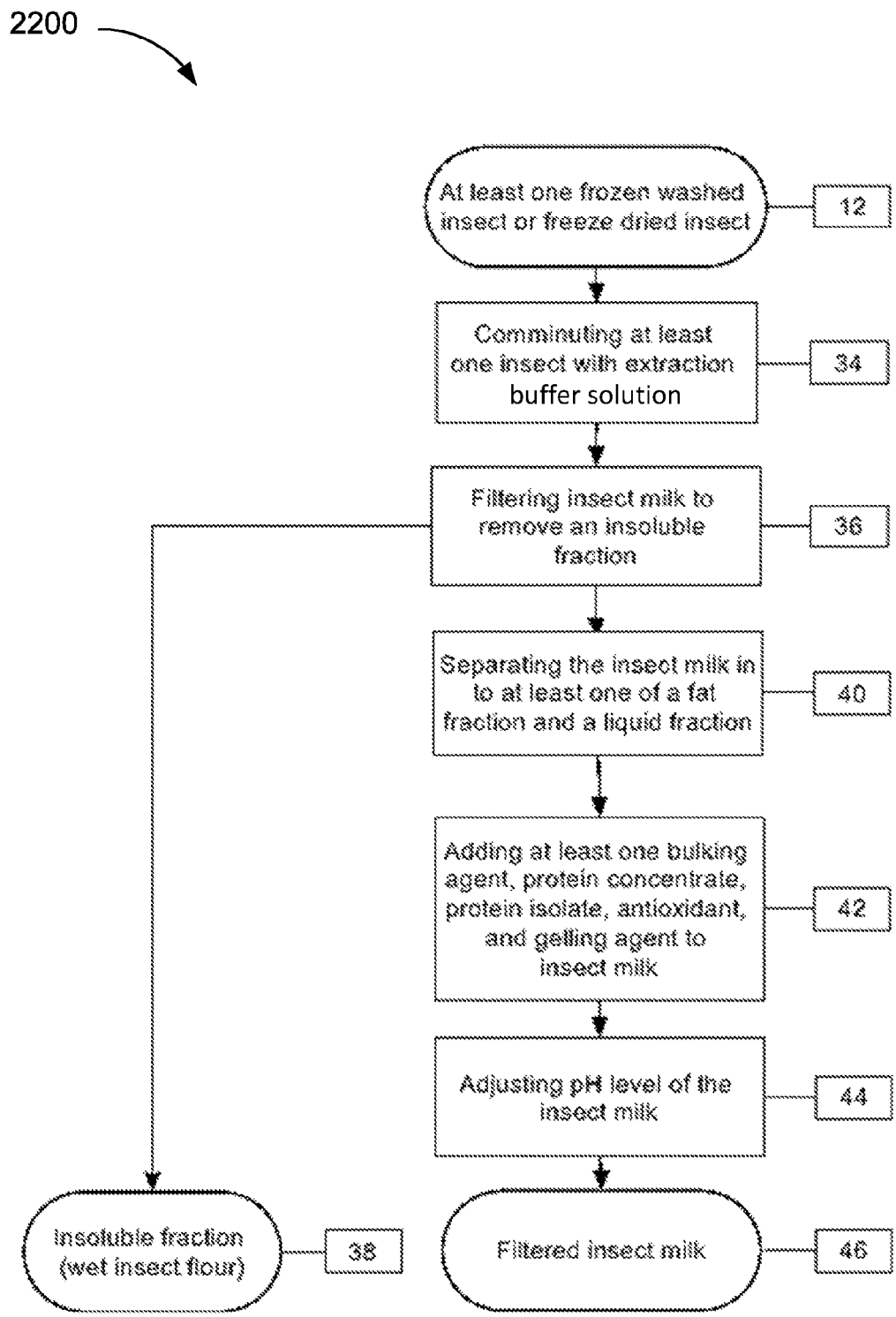
FIG. 2C is a flow chart illustrating another non-limiting example embodiment of aspects of the process illustrated in FIG. 2A.

Attention is directed to FIG. 2C, which depicts a non-limiting example embodiment of some aspects of process 2000. For clarity, the process depicted in FIG. 2C will be referred to as "process 2200". The following discussion of process 2200 will lead to a further understanding of process 2000 and various aspects thereof. However, it is understood that process 2200 is only an example embodiment of aspects of process 2000 and can be varied, and that such variations are within the scope of the present specification. Furthermore, as in process 2000, process 2200 need not be performed in the exact sequence as shown, unless otherwise indicated; and likewise various Blocks may be performed in parallel rather than in sequence; hence the elements of process 2000 are referred to herein as "Blocks" rather than "steps".

Similarly to Block 24, at Block 34 at least one insect, such as the at least one washed, frozen insect from Block 12, is processed to produce an insect milk by combining the at least one insect with an extraction buffer solution containing at least one of a monovalent salt, a divalent salt and a phosphate salt, and reducing the at least one insect into a plurality of insect particles of a desired particle size. For example, the at least one insect is comminuted with an extraction buffer solution at a ratio of insect weight to extraction buffer solution in a range of about 1:1 and about 1:10 w/w. In some embodiments, the ratio of insect weight to extraction buffer solution is about 1:2. Comminution may be performed, for example, by using a blender, wet mill, or other suitable comminuting device or implement. In some embodiments, the at least one insect is comminuted with an extraction buffer solution using an immersion blender. In some embodiments, the at least one insect is crushed using a press. To improve filtration, insects may be comminuted coarsely using a blender on a middle to low setting.

At Block 36, the insect milk is filtered to remove an insoluble fraction from the insect milk (such as chitin from the at least one insect). In some embodiments, the filtration may be performed using a mesh screen having a pore size less than about 2000 microns. In some embodiments, filtration may also be performed using a decanter centrifuge. In some embodiments, insect milk is filtered using a mesh screen having a pore size of about 100 microns. The insoluble fraction is separated at Block 36 as wet insect flour (Block 38). To increase insect milk yield, wet insect flour may be further pressed using a press and cheesecloth or other porous medium to further expel insect milk from the wet insect flour (insoluble fraction).

At Block 40, the insect milk can be separated into at least one of a fat fraction and a liquid fraction (also referred to herein as the "insect milk" after the separating) as described above in respect of Block 26. In some embodiments, the insect milk is not fractionated.

At Block 42, at least one of a bulking agent, a protein concentrate, a protein isolate, an antioxidant and a gelling agent may be added to the insect milk, as described above in respect of Block 28.

At Block 44, the insect milk pH is adjusted in a manner similar to that described above in respect of Block 30. At Block 46, filtered insect milk, according to example process 2200, is obtained.

Figure 3A:
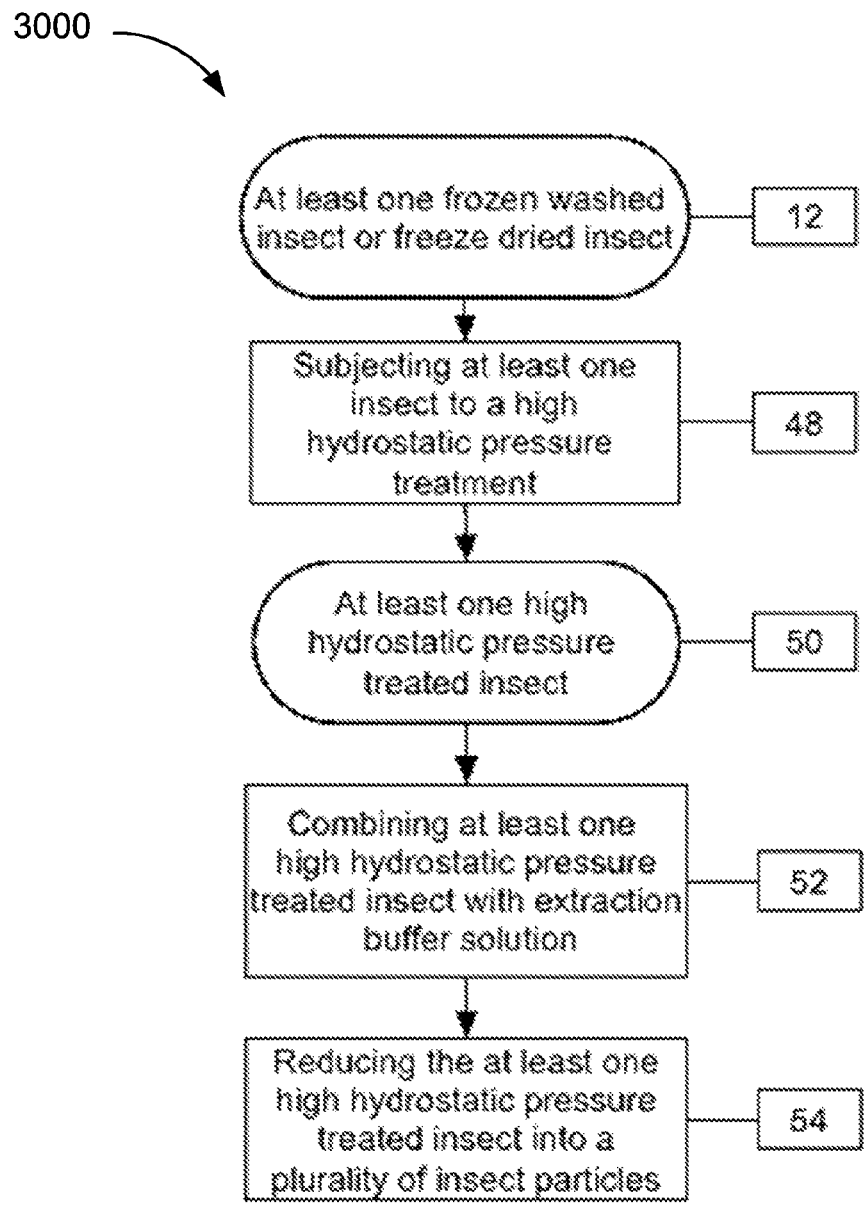
FIG. 3A is a flow chart illustrating a process of producing an edible protein product derived from at least one insect, according to a second set of non-limiting embodiments.

Attention is directed to FIG. 3A, which depicts a flowchart of another process 3000 for producing an edible protein product derived from at least one insect, according to a non-limiting embodiment. In particular, process 3000 can be used to produce an insect protein concentrate from high hydrostatic pressure treated insect milk. It is to be emphasized that process 3000 need not be performed in the exact sequence as shown, unless otherwise indicated; and likewise various Blocks may be performed in parallel rather than in sequence; hence the elements of process 3000 are referred to herein as "Blocks" rather than "steps".

At Block 48, at least one insect, such as the at least one washed, frozen insect from Block 12, is subjected to a high hydrostatic pressure treatment to obtain at least one high hydrostatic pressure treated insect (Block 58). In some embodiments, the high hydrostatic pressure treatment comprises subjecting the at least one insect to a treatment pressure in a range of about 250 MPa to about 450 MPa. In some related embodiments, the treatment pressure is applied for about 5 to about 15 minutes.

The at least one high hydrostatic pressure treated insect processed to produce a high hydrostatic pressure treated insect milk. The processing is performed by combining the at least one high hydrostatic pressure treated insect with an extraction buffer solution containing at least one antioxidant (Block 52), and reducing the at least one high hydrostatic pressure treated insect into a plurality of insect particles of a desired particle size (Block 54). In some embodiments, combining the high hydrostatic pressure treated insects with the extraction buffer solution and reducing the high hydrostatic pressure treated insect into a plurality of insect particles is performed separately. In some embodiments, combining the high hydrostatic pressure treated insects with the extraction buffer solution and reducing the high hydrostatic pressure treated insect into a plurality of insect particles is performed simultaneously. Since the final product may be an insect protein concentrate, the extraction buffer solution may contain fewer salts than the extraction buffer solution as described above in respect of Block 30 to reduce the sodium content in the final product. In some embodiments, the extraction buffer solution may be un-alkylated and may contain only an antioxidant to prevent rancidity. In some embodiments, the extraction buffer solution does not contain any salts. In some embodiments, the extraction buffer solution has a pH level in a range of about pH 9 to about pH 12. In some embodiments, the extraction buffer solution contains: about 0.075% ascorbic acid and about 0.075% citric acid and may be adjusted with about 6 M sodium hydroxide to a pH between about 9 and about 12. In some embodiments, the extraction buffer solution contains about 0.075% ascorbic acid and about 0.075% citric acid and is not alkylated.

Figure 3B:
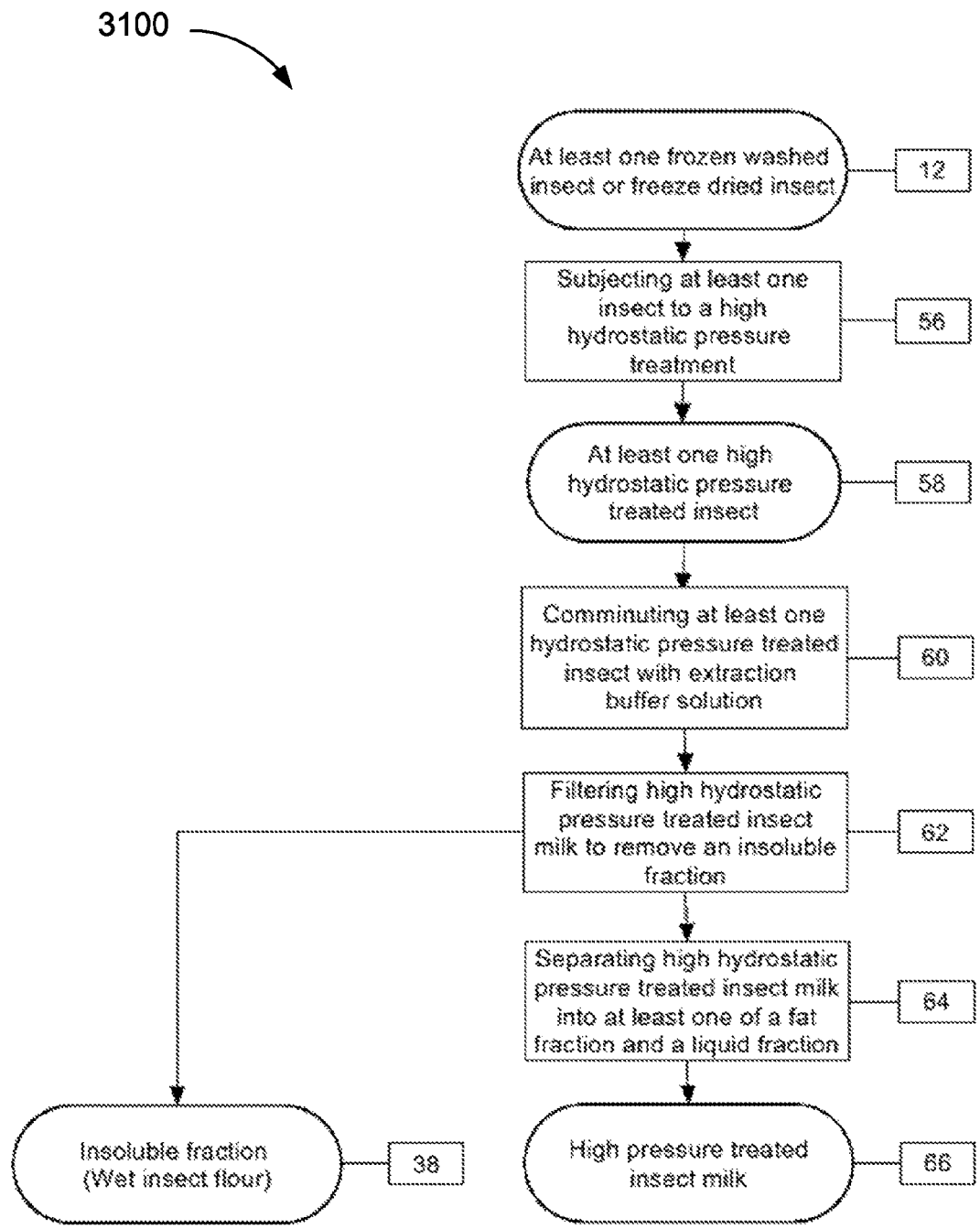
FIG. 3B is a flow chart illustrating a non-limiting example embodiment of aspects of the process illustrated in FIG. 3A.

FIG. 3B depicts a non-limiting example embodiment of some aspects of process 3000. For clarity, the process depicted in FIG. 3B will be referred to as "process 3100". The following discussion of process 3100 will lead to a further understanding of process 3000 and various aspects thereof. However, it is understood that process 3100 is only an example embodiment of aspects of process 3000 and can be varied, and that such variations are within the scope of the present specification. Furthermore, as in process 3000, process 3100 need not be performed in the exact sequence as shown, unless otherwise indicated; and likewise various Blocks may be performed in parallel rather than in sequence; hence the elements of process 3000 are referred to herein as "Blocks" rather than "steps".

At Block 56, at least one insect, such as the at least one washed, frozen insect from Block 12, is subjected to a high hydrostatic pressure treatment to obtain at least one high hydrostatic pressure treated insect (Block 58). For example, insects can be vacuum packed into flexible polyethylene bags or other flexible packaging suitable for high pressure treatment. In this example embodiment, the insect or insects are subjected to high hydrostatic pressure treatment in a treatment pressure in the range of about 250 to about 450

MPa for about 5 to about 15 minutes to obtain at least one high pressure treated frozen or freeze dried insect at Block 58.

The high pressure treated insects are processed to produce a high hydrostatic pressure treated insect milk by combining the high hydrostatic pressure treated insects with an extraction buffer solution containing at least one antioxidant, and reducing the high hydrostatic pressure treated insects into a plurality of insect particles of a desired particle size. For example, at Block 60, the high pressure treated insects are comminuted with an extracting buffer solution containing an antioxidant as described above. In some embodiments, the ratio of insect weight to extraction buffer solution weight may be between about 2:1 (about 2 to 1) to about 1:10 (about 1 to 10). In some embodiments, the ratio of insect weight to extraction buffer solution weight is about 2:3 (about 2 to 3).

At Block 62, the high hydrostatic pressure treated insect milk is filtered to remove an insoluble fraction from the high hydrostatic pressure treated insect milk. The insoluble fraction may comprise chitin from the at least one high hydrostatic pressure treated insect. To increase insect milk yield, wet insect flour may be further pressed using a press and cheesecloth or other porous medium to further expel insect milk from the insoluble fraction. For example, the filtration may be performed using a mesh screen having a pore size less than about 2000 microns. In some embodiments, the filtration may also be performed using a decanter centrifuge or a vibratory screen. In some embodiments, the high hydrostatic pressure treated insect milk is filtered using a mesh screen having a pore size of about 100 microns. The insoluble fraction removed at Block 62 and obtained at Block 38 as wet insect flour that is derived from high hydrostatic pressure treated insect milk.

At Block 64, the high hydrostatic pressure treated insect milk is separated into at least one of a fat fraction of the high hydrostatic pressure treated insect milk and a liquid fraction of the high hydrostatic pressure treated insect milk. For example, the high hydrostatic pressure treated insect milk can be centrifuged or fractionated as described above in respect of Block 26. In some embodiments, the milk is not fractionated. At Block 66, high hydrostatic pressure treated insect milk, according to the example process 3100, is obtained.

Figure 4A:
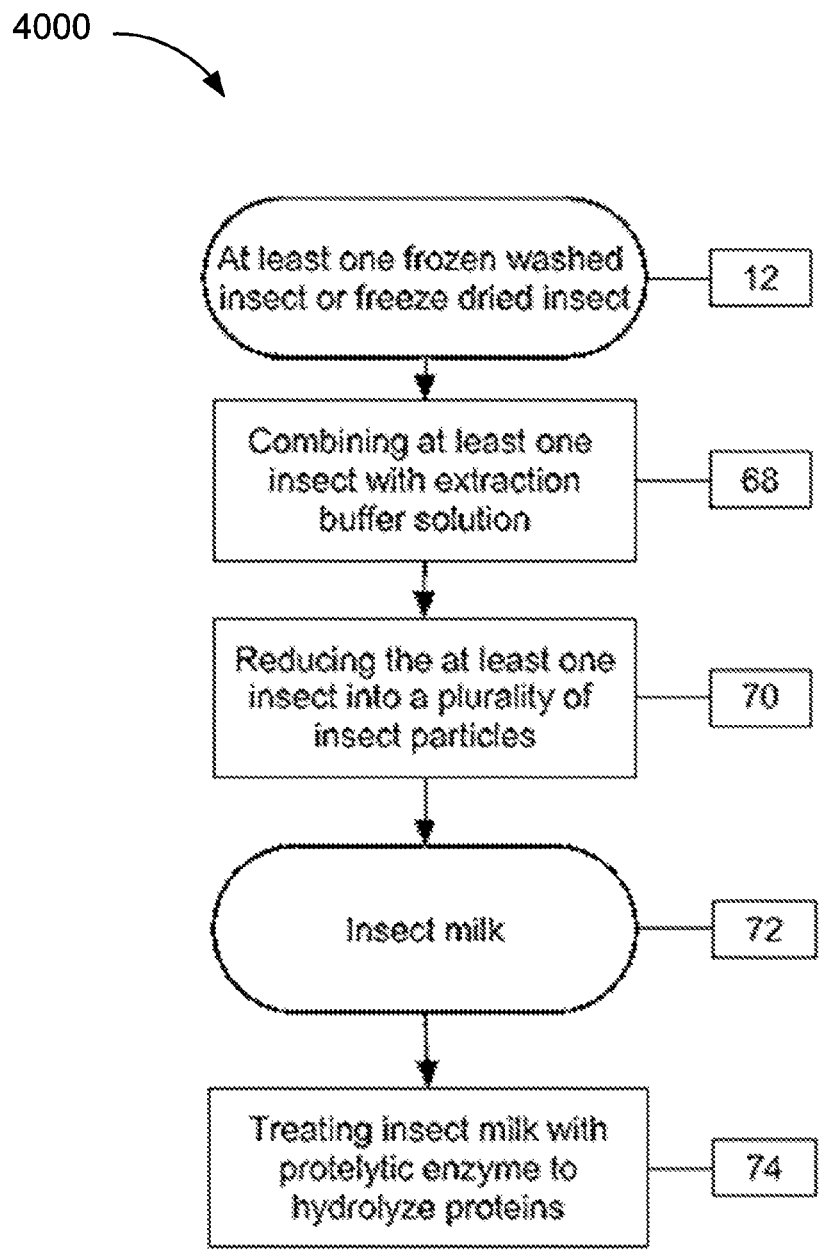
FIG. 4A is a flowchart illustrating a process of producing an edible protein product derived from at least one insect, according to a third set of non-limiting embodiments.

Attention is directed to FIG. 4A, which depicts a flowchart of another process 4000 for producing an edible protein product derived from at least one insect, according to a non-limiting embodiment. In particular, process 4000 can be used to produce an insect protein concentrate from enzyme treated insect milk. It is to be emphasized that process 4000 need not be performed in the exact sequence as shown, unless otherwise indicated; and likewise various Blocks may be performed in parallel rather than in sequence; hence the elements of process 4000 are referred to herein as "Blocks" rather than "steps".

At least one insect, such as the at least one washed, frozen insect from Block 12, is processed to produce an insect milk (Block 72) by combining the at least one insect with an extraction buffer solution containing at least one antioxidant (Block 68), and reducing the at least one insect into a plurality of insect particles of a desired particle size (Block 70). In some embodiments, combining the at least one insect with the extraction buffer solution and reducing the at least one insect into a plurality of insect particles is performed separately. In some embodiments, combining the at least one insect with the extraction buffer solution and reducing the at least one insect into a plurality of insect particles is performed simultaneously.

At Block 74, the insect milk is treated with a proteolytic enzyme to hydrolyze proteins of the insect milk. In some embodiments, the proteolytic enzyme comprises at least one of an acidic, neutral, or alkaline protease. In some embodiments, the proteolytic enzyme is at least one of ficin, papain, bromelain, subtilisin, trypsin, chymotrypsin and pepsin. The enzymatic treatment can be performed under different thermal and/or temporal conditions. For example, in some embodiments, treating the insect milk comprises heating the insect milk to about 40° C. to about 60° C. In some embodiments, the treating comprises hydrolyzing the proteins using the proteolytic enzyme for a duration of about 2 minutes to about 60 minutes. In some embodiments, the treating comprises hydrolyzing the proteins using the proteolytic enzyme for a duration of about 5 to about 60 minutes. In some embodiments, the treating comprises hydrolyzing the proteins using the proteolytic enzyme for a duration of about 25 minutes.

Figure 4B:
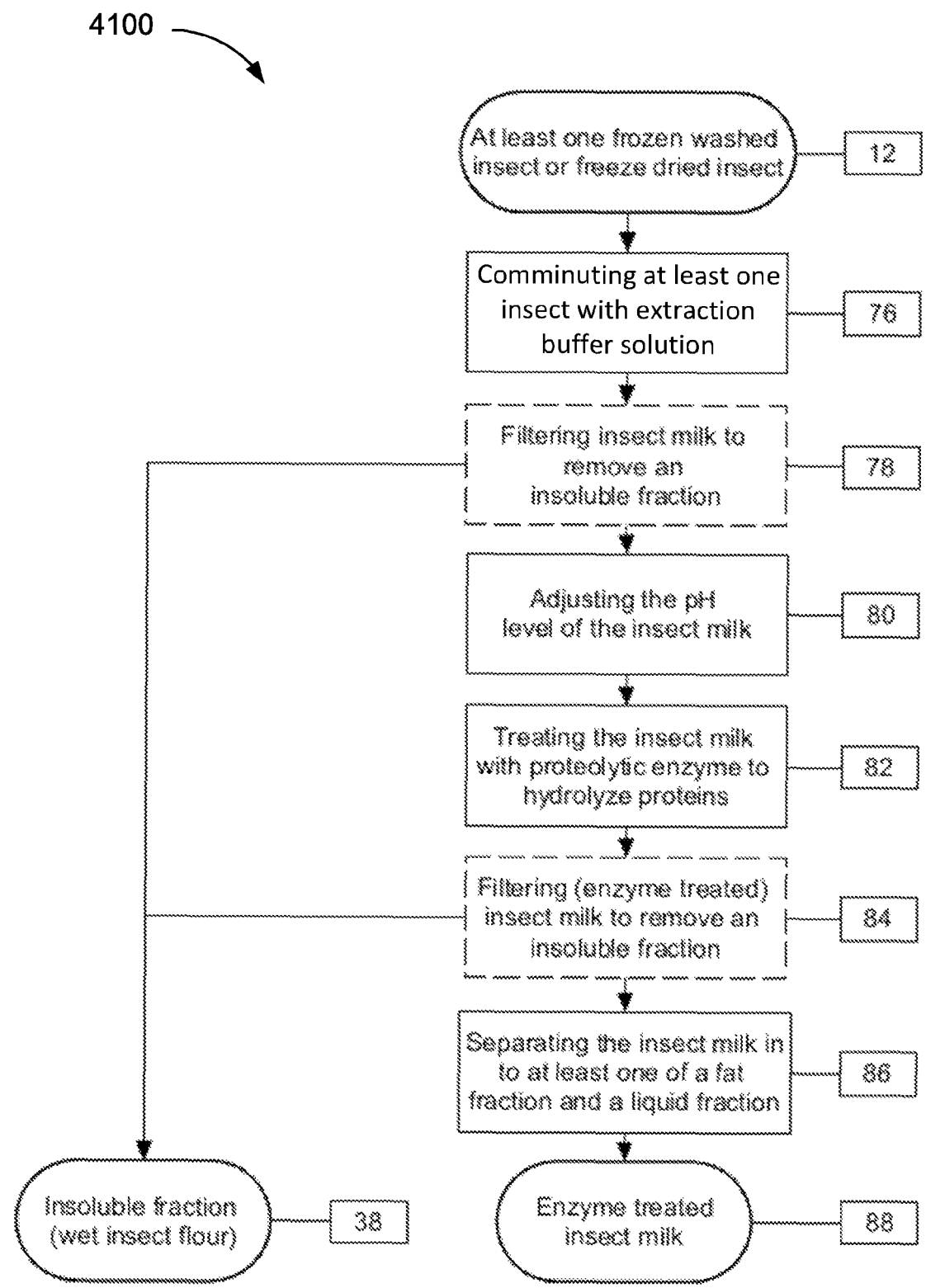
FIG. 4B is a flow chart illustrating a non-limiting example embodiment of aspects of the process illustrated in FIG. 4A.

FIG. 4B depicts a non-limiting example embodiment of some aspects of process 4000. For clarity, the process depicted in FIG. 4B will be referred to as "process 4100". The following discussion of process 4100 will lead to a further understanding of process 4000 and various aspects thereof. However, it is understood that process 4100 is only an example embodiment of aspects of process 4000 and can be varied, and that such variations are within the scope of the present specification. Furthermore, as in process 4000, process 4100 need not be performed in the exact sequence as shown, unless otherwise indicated; and likewise various Blocks may be performed in parallel rather than in sequence; hence the elements of process 4000 are referred to herein as "Blocks" rather than "steps".

At least one insect, such as the at least one washed, frozen insect from Block 12, is processed to produce an insect milk. For example, at Block 76 the insects may be comminuted with an extracting buffer solution containing an antioxidant as described above. In some embodiments, the extraction buffer solution has a pH level in a range of about 9 to about 12 and further comprises water and an alkylating agent.

In some embodiments, the ratio of insect weight to extraction buffer solution weight may be in a range of about 2:1 (2 to 1) to about 1:10 (1 to 10). In some embodiments, the ratio of insect weight to buffer solution weight is about 2:3 (2 to 3).

At Block 78, the insect milk can be filtered to remove an insoluble fraction, such as chitin from the at least one insect, from the insect milk as described above in respect of Blocks 36 and 62. For example, the filtration may be performed using a mesh screen having a pore size less than about 2000 microns. In some embodiments, the filtration may also be performed using a decanter centrifuge. In some embodiments, insect milk can be filtered using a mesh screen having a pore size of about 100 microns. The solid fraction is removed at Block 78 as wet insect flour derived from enzyme treated insect milk (Block 38). Alternatively, filtration may be performed after the enzyme treatment at Block 84.

At Block 80, prior to treating the insect milk with the proteolytic enzyme (Block 82), the pH level of the insect milk is adjusted in preparation for enzyme treatment. In some embodiments, pH level of the insect milk may be adjusted to a pH level in a range of about 5 to about 9 depending on the enzyme used. In some embodiments, the pH level of the insect milk may be adjusted to a pH level in a range of about 7 to about 9. In some embodiments, the pH level of the insect milk may be adjusted to a pH level in a range of about 7 to about 9 and an alkaline protease is used for the enzyme treatment. In some embodiments, the pH level of the insect milk may be adjusted to a pH level of about 7.

At Block 82, the insect milk is treated with a proteolytic enzyme to hydrolyze proteins of the insect milk. For example, in some embodiments, an acidic, neutral, or alkaline protease may be used. Non-limiting examples of some suitable proteases include: ficin, papain, bromelain, subtilisin, trypsin, chymotrypsin, pepsin, or other proteases. In some embodiments, an alkaline protease, subtilisin obtained from *Bacillus subtilis*, is used which is available under the trademarks FoodPro® PD or FoodPro® PXT PD, from Danisco®. In some embodiments, the insect milk pH is adjusted to a pH of 7 and warmed to a temperature in a range of about 40 to about 60° C. In some embodiments, purified liquid subtilisin can be added to the insect milk at a concentration of 0.25 to 1% w/w of the insect milk and the insect milk is hydrolyzed under these conditions for a duration of about 5 to about 60 minutes. In some embodiments, the duration (also referred to herein as "hydrolysis time") is about 25 minutes.

If not yet performed, in some embodiments, the insect milk may be filtered at Block 84 to remove an insoluble fraction from the insect milk. Filtration may be performed as described above to obtain wet insect flour (Block 38).

At Block 86, is separated into at least one of a fat fraction of the insect milk and a liquid fraction of the insect milk. For example, the insect milk can be centrifuged or fractionated as described above. Separated fat may be added back to the insect milk to standardize the fat content. In some embodiments, the insect milk is not fractionated. At Block 88, enzyme treated insect milk, according to example process 4100, is obtained.

Protein Gelation

Figure 5:
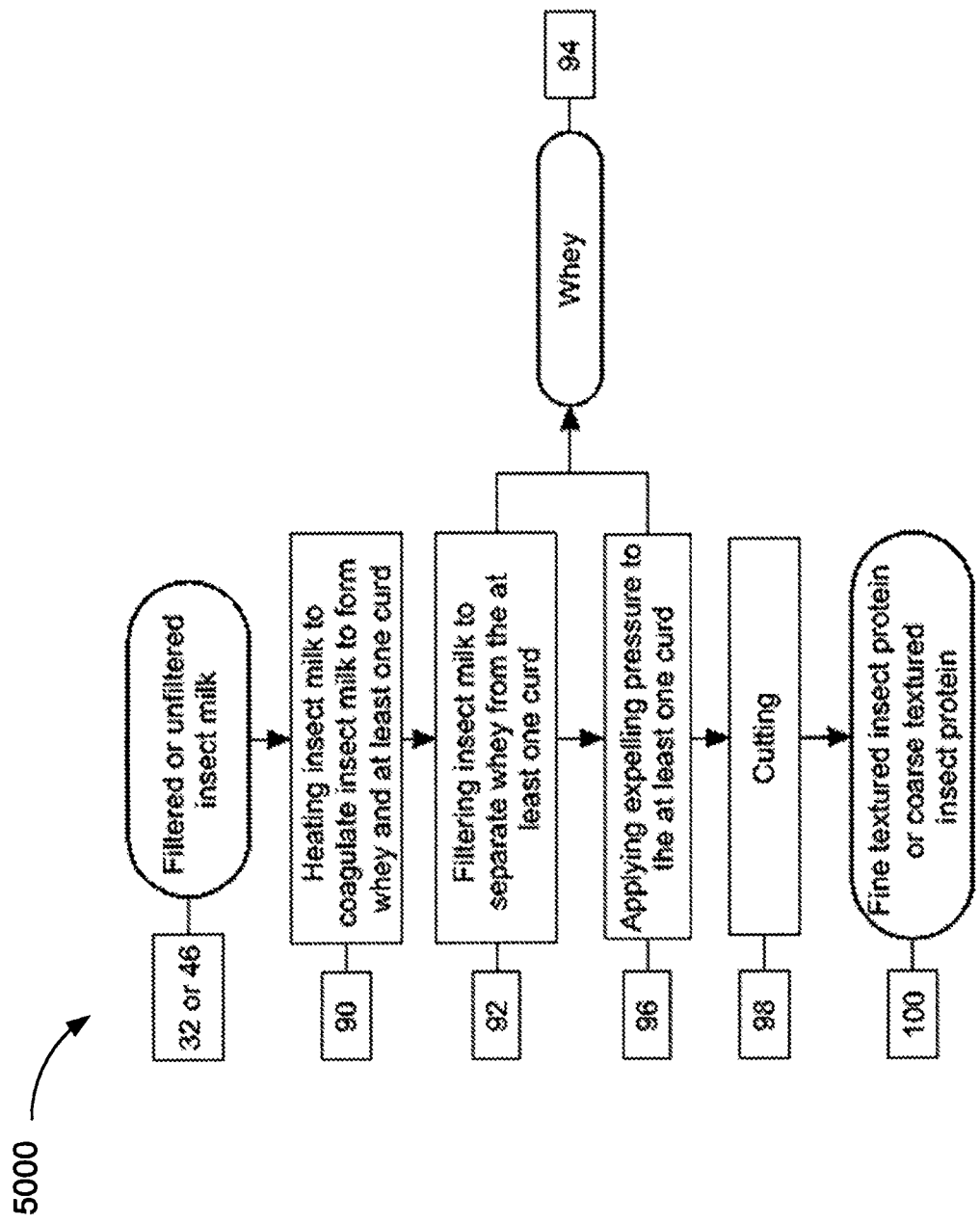
FIG. 5 is a flow chart illustrating a method of thermally coagulating filtered or unfiltered insect milk to produce a fine or coarse textured insect protein gel and a liquid insect whey byproduct, according to a non-limiting embodiment.

A non-limiting example of a protein gelation process 5000 is presented in FIG. 5. The following discussion of process 5000 will lead to a further understanding of at least some of the processes described above and various aspects thereof. However, it is understood that process 5000 is only an example embodiment of aspects of above described processes and can be varied, and that such variations are within the scope of the present specification. It is to be emphasized that process 5000 need not be performed in the exact sequence as shown, unless otherwise indicated; and likewise various Blocks may be performed in parallel rather than in sequence; hence the elements of process 5000 are referred to herein as "Blocks" rather than "steps".

The starting material for the example gelation process 5000 is filtered or unfiltered insect milk of Block 32 or Block 46. The insect milk of Block 32 or Block 46 is heated at Block 90 to coagulate the insect milk to form whey and at least one curd. For example, in some embodiments, the insect milk is heated to a temperature of at least about 65° C. to thermally denature and coagulate proteins. Coagulation temperatures may vary depending on the insect species used, the insect milk pH, protein concentration, and ionic strength. Heating the insect milk as rapidly as possible may prevent undesirable enzymatic changes to the insect milk which may include discoloration, proteolysis, or the formation of off flavors. Heating may be performed using indirect heating using, for example, a jacketed steam kettle, scrapped surface heat exchanger, or stovetop, or by direct heating by steam injection or steam infusion. The insect milk may be stirred during heating to help prevent burning or scorching of proteins and to help ensure rapid and even temperature rise. In some embodiments, the unfiltered or filtered insect milk is heated to boiling in a steam kettle. In some embodiments, the insect milk is held at a temperature of at least about 90° C. for about at least 2 minutes to destroy microorganisms and inactivate endogenous insect enzymes that may lead to discoloration and undesirable flavor and texture in the final product. After heating, the insect milk coagulates forming at least two fractions, a solid 'curd' and liquid 'whey'.

At Block 92, the coagulated insect milk may be filtered to separate the whey from the at least one curd. For example, the filtration may be performed using a fine cheesecloth or other suitable filter to separate the at least one curd from the whey (also referred to herein as "liquid insect whey"). The liquid insect whey may be collected at Block 94.

At Block 96, an expelling pressure may be applied to the at least one curd to expel additional whey from the at least one curd and to form at least one curd of coarse textured insect protein. In some embodiments, the expelling pressure is about 0.1 psi to about 100 psi. In some embodiments, the expelling pressure is about 0.1 psi to about 20 psi. The expelling pressure may be applied in any suitable manner. For example, the expelling pressure may be applied using at least one of a hydraulic press, a pneumatic press and weighted plates. In some embodiments, curds may be ladled into cheesecloth-lined, perforated pans and pressed with about 0.5 psi of expelling pressure using weights. The expelling pressure may be applied for as long as needed to expel a desired amount of additional whey from the curds. In some embodiments, curds are pressed for about 25 minutes. The additional whey expelled during pressing is collected at Block 94.

At Block 98, the curds are cut, portioned, and packed as textured insect protein (Block 100). When the starting material in process 5000 is unfiltered insect milk, the textured insect protein comprises coarse textured insect protein. When the starting material in process 5000 is filtered insect milk, the textured insect protein comprises fine textured insect protein.

Protein Concentration and Drying

Figure 6:
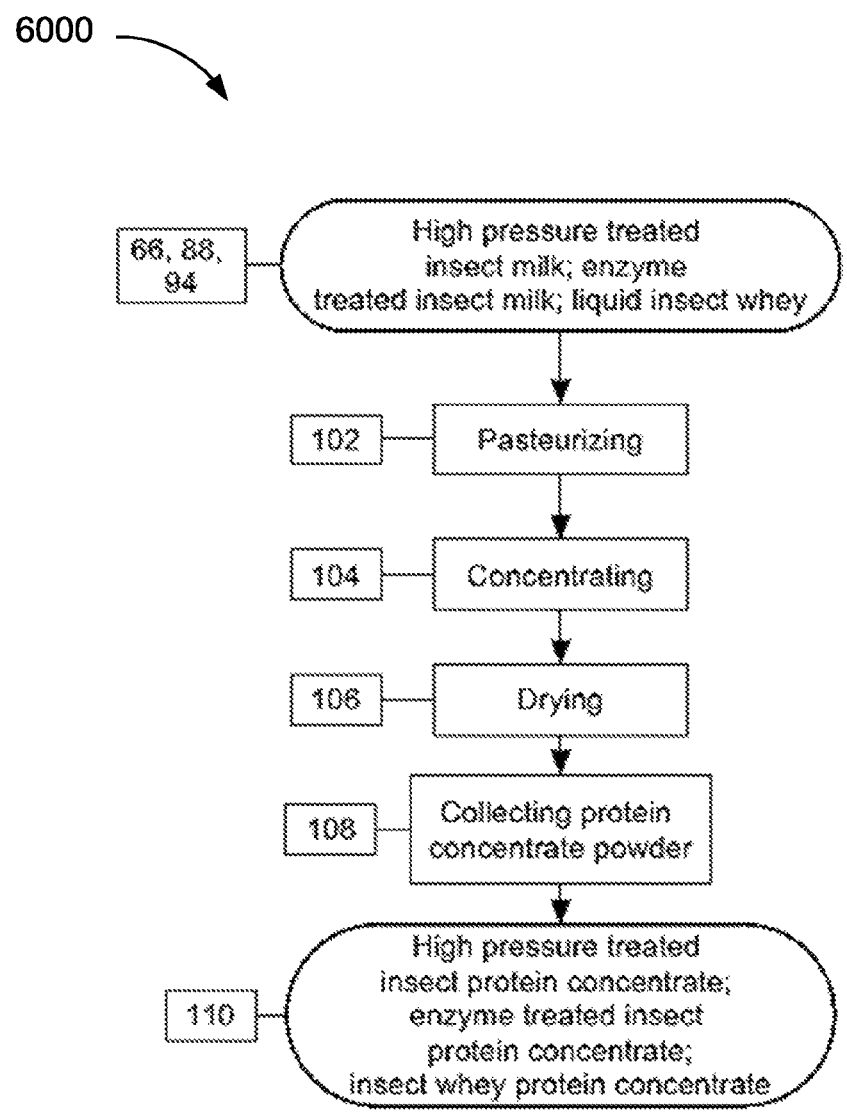
FIG. 6 is a flow chart illustrating a process to prepare an insect protein concentrate powder from high pressure processed insect milk, enzyme treated insect milk, or liquid insect whey, according to a non-limiting embodiment.

A non-limiting example of a protein concentration and drying process 6000 is presented in FIG. 6. The following discussion of process 6000 will lead to a further understanding of at least some of the processes described above and various aspects thereof. However, it is understood that process 6000 is only an example embodiment of aspects of above described processes and can be varied, and that such variations are within the scope of the present specification. It is to be emphasized that process 6000 need not be performed in the exact sequence as shown, unless otherwise indicated; and likewise various Blocks may be performed in parallel rather than in sequence; hence the elements of process 6000 are referred to herein as "Blocks" rather than "steps".

The starting material for this process may be high hydrostatic pressure treated insect milk of Block 66, enzyme treated insect milk of Block 88, or liquid insect whey of Block 94. In some embodiments, the high hydrostatic pressure treated insect milk, enzyme treated insect milk, or liquid insect whey may be pasteurized at Block 102 to reduce microbial loads and inactivate endogenous and exogenous enzymes that may be present. Pasteurization may be carried out at a variety of time-temperature combinations either continuously as in a high-temperature short-time process, or in batch as in a vat pasteurization process. The high hydrostatic pressure treated insect milk, enzyme treated insect milk, or liquid insect whey may be pasteurized using at least one of a heat exchanger or a vat. In some embodiments, the high hydrostatic pressure treated insect milk, enzyme treated insect milk, or liquid insect whey may be pasteurized at about 72° C. for about 15 seconds. In some embodiments, the high hydrostatic pressure treated insect milk, enzyme treated insect milk, or liquid insect whey may be pasteurized at about 72° C. for about 15 seconds in a plate heat exchanger. In some embodiments, the high hydrostatic pressure treated insect milk, enzyme treated insect milk, or liquid insect whey is not pasteurized.

At Block 104, the high hydrostatic pressure treated insect milk, enzyme treated insect milk, or liquid insect whey may be concentrated by reducing a water content of the respective high hydrostatic pressure treated insect milk, enzyme treated insect milk, or liquid insect whey. Reducing the water content may also improve the effectiveness of the subsequent drying step. The high hydrostatic pressure treated insect milk, enzyme treated insect milk, or liquid insect whey may be concentrated by performing at least one of open boiling, vacuum evaporation in a falling or rising film evaporator or vacuum kettle, reverse osmosis, or another suitable concentration process. Concentrating the liquid insect whey produces an insect whey protein concentrate. Concentrating the high hydrostatic pressure treated insect milk produces a high hydrostatic pressure treated insect milk protein concentrate. Concentrating the enzyme treated insect milk produces an enzyme treated insect milk protein concentrate. At this stage, the insect whey protein concentrate, high hydrostatic pressure treated insect milk and enzyme treated insect milk protein concentrate may be in liquid form.

In some embodiments, the solids content of the insect whey protein concentrate, high hydrostatic pressure treated insect milk protein concentrate or enzyme treated insect milk protein concentrate is about 8% to about 55% solids. In some embodiments, the solids content of the insect whey protein concentrate, high hydrostatic pressure treated insect milk protein concentrate or enzyme treated insect milk protein concentrate is about 18% to about 55% solids. In some embodiments, the solids content of the insect whey protein concentrate, high hydrostatic pressure treated insect milk protein concentrate or enzyme treated insect milk protein concentrate is about 21%. For example, in some embodiments, the high hydrostatic pressure treated insect milk, enzyme treated insect milk, or liquid insect whey is concentrated by vacuum evaporation to have a solids content in a range of about 18 to about 55%. In some embodiments, the high hydrostatic pressure treated insect milk, enzyme treated insect milk, or liquid insect whey is concentrated to have a solids content of about 21% solids.

In some embodiments, the solids content of the insect whey protein concentrate is about 8% to about 55% solids. In some embodiments the solids content of the insect whey protein concentrate is about 18% to about 55% solids. In some embodiments, the solids content of the insect whey protein concentrate is about 21% solids.

At Block 106, the insect whey protein concentrate, high hydrostatic pressure treated insect milk and enzyme treated insect milk protein concentrate may be dried to produce a protein concentrate powder, such as an insect whey protein concentrate powder, high hydrostatic pressure treated insect milk concentrate powder and an enzyme treated insect milk protein concentrate powder. Concentrated insect milk or whey may be dried by any suitable drying method including but not limited to: drum drying, freeze drying, spray drying, tray drying, or refractance window drying. In some embodiments, concentrated insect milk or whey may be warmed to at least about 40° C. and spray dried at an inlet air temperature in a range of about 165 to about 200° C., an outlet temperature in a range of about 65 to about 100° C. In some embodiments, concentrated insect milk or whey may be spray dried at an inlet temperature of about 165° C. and an outlet temperature of about 65° C.

At Block 108, the dried protein concentrate powder is collected and at Block 110 as an insect protein concentrate or insect whey protein concentrate powder. When the starting material in FIG. 6 is high pressure treated insect milk, high hydrostatic pressure treated insect protein concentrate is produced using process 6000. When the starting material in FIG. 6 is enzyme treated insect milk, enzyme treated insect protein concentrate is produced using process 6000. When the starting material in FIG. 6 is liquid insect whey, insect whey protein concentrate is produced using process 6000.

Figure 7:
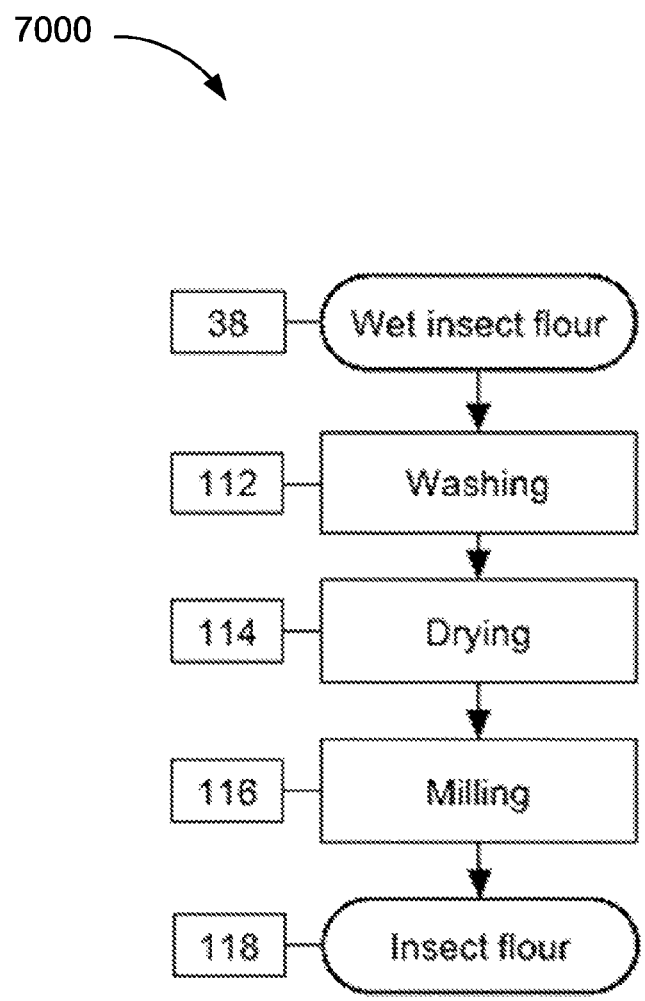
FIG. 7 is a flow chart illustrating a process for washing and drying wet insect flour derived as a byproduct of insect milk production, according to a non-limiting embodiment.

FIG. 7 depicts a non-limiting example process 7000 of drying and further processing the wet insect flour (also referred to herein as the insoluble fraction) of Block 38 to produce a dried edible insect flour. The following discussion of process 7000 will lead to a further understanding of at least some of the processes described above and various aspects thereof. However, it is understood that process 7000 is only an example embodiment of aspects of above described processes and can be varied, and that such variations are within the scope of the present specification. It is to be emphasized that process 7000 need not be performed in the exact sequence as shown, unless otherwise indicated; and likewise various Blocks may be performed in parallel rather than in sequence; hence the elements of process 7000 are referred to herein as "Blocks" rather than "steps".

At Block 112, wet insect flour may be washed with potable water to remove traces of salts introduced in previous steps. The wet insect flour may be washed by immersing the wet insect flour in a ratio about 1 to about 10 times the mass of the wet insect flour with mass of water. At Block 114, the washed, wet insect flour may be dried by any suitable method. Some non-limiting examples of suitable drying methods are tray drying, refractance window drying, spray drying, freeze drying, and drum drying. In some embodiments, the wet cricket flour is loaded on trays and dried in an oven at about 250° F. until the wet cricket flour reaches a moisture content below about 5%. In some embodiments, the wet insect flour is not washed prior to drying.

At Block 116, the dried insect flour may be milled to reduce its particle size and to yield milled insect flour at Block 118. Milling may be performed in any suitable manner. For example, in some embodiments, the milling may be performed using at least one of a hammer mill, blender, rotor-stator homogenizer, or any other suitable milling device or implement. In some embodiments, wet insect flour may be milled using a hammer mill. When the wet insect flour (Block 38) is derived from high hydrostatic pressure treated insect milk (Block 66), the milled insect flour at Block 118 is an edible high hydrostatic pressure treated insect flour. When the wet insect flour (Block 38) is derived from filtered insect milk (Block 46), the milled insect flour at Block 118 is an edible insect flour. When the wet insect flour (Block 38) is derived from enzyme treated insect milk (Block 88), the milled insect flour at Block 118 is an edible enzyme treated insect flour.

Figure 8:
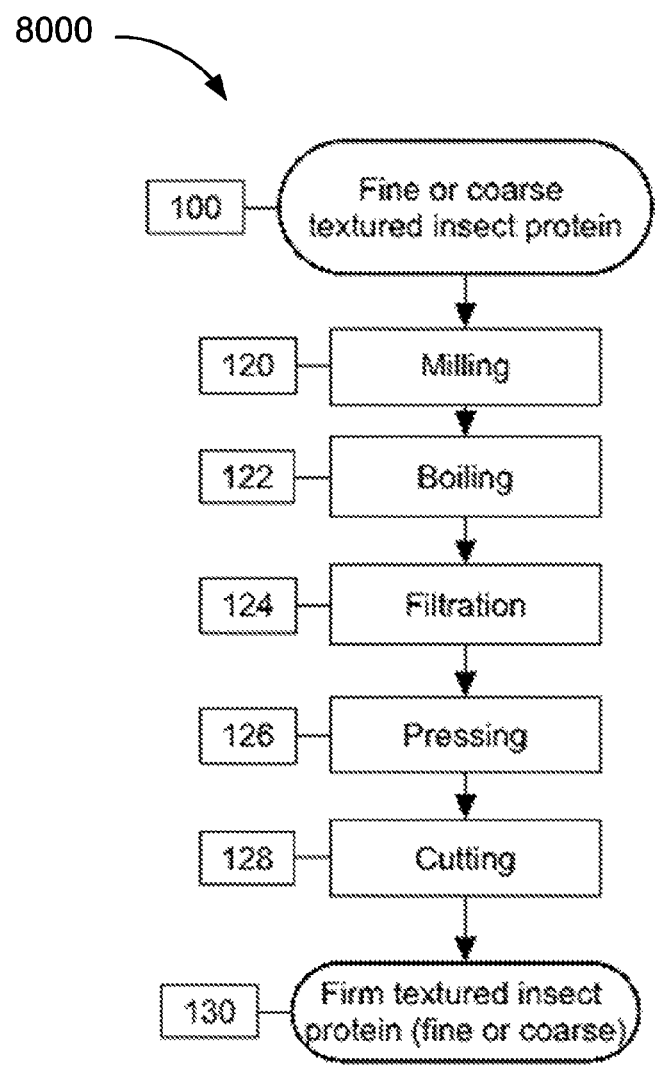
FIG. 8 is a flow chart illustrating a process for further processing fine or coarse textured insect protein to increase the firmness of the textured insect protein gel, according to a non-limiting embodiment.

FIG. 8 depicts an example process 8000 for further processing fine or coarse textured insect protein to increase the firmness of the textured insect protein gel. The following discussion of process 8000 will lead to a further understanding of at least some of the processes described above and various aspects thereof. However, it is understood that process 8000 is only an example embodiment of aspects of above described processes and can be varied, and that such variations are within the scope of the present specification. It is to be emphasized that process 8000 need not be performed in the exact sequence as shown, unless otherwise indicated; and likewise various Blocks may be performed in parallel rather than in sequence; hence the elements of process 8000 are referred to herein as "Blocks" rather than "steps".

The fine or coarse TIP from Block 100 may be milled, boiled and an additional expelling pressure applied to at least one curd of coarse TIP or at least one curd of fine TIP. For example, at Block 120, fine or coarse TIP from Block 100 may be milled into small pieces in any suitable manner, such as using a wet mill, blender, food processor, or by crumbling by hand. In some embodiments, milled curds of coarse TIP or curds of fine TIP may be added to water in a ratio of curd to water of between about 2 to about 1. In some embodiments, milled curds of coarse TIP or curds of fine TIP may be added to water in water in a ratio of curd to water of between about 1 to about 10. In some embodiments, milled curds of coarse TIP or curds of fine TIP may be added to water in a ratio of curd to water of between about 2 to about 1. For example, curds of the TIP, fine or coarse, may be milled using a food processor and added to twice the weight of the TIP curds in potable water. At Block 122, after the milling, curds of the TIP are boiled. In some embodiments, the milled curds of the TIP are boiled for a duration in a range of about 1 to about 60 minutes to expel whey. In some embodiments, curds of the TIP are boiled for about 10 minutes.

At Block 124, the boiled TIP may be filtered through a fine cheesecloth or mesh filter to separate the TIP from the expelled whey. At Block 126, the TIP may be transferred to a mold and pressed. TIP may be pressed at any appropriate amount of pressure and for any suitable duration. In some embodiments, the TIP is pressed for up to about 1 hour. In some embodiments, TIP is pressed at about 0.5 psi for about 25 minutes using a mold with a weighted plate.

At Block 128, the pressed TIP is removed from the mold, cut, portioned, and packed as firm TIP at Block 130. When the starting material in FIG. 8 is coarse TIP, the firm TIP of Block 130 is firm coarse TIP. When the starting material in FIG. 8 is fine TIP, the firm TIP of Block 130 is firm fine TIP.

In some embodiments, the edible textured insect protein product has a storage modulus of at least about $10^4$ Pa over a temperature of about 4° C. to about 40° C. In some embodiments, the edible textured protein product has a storage modulus of about $10^5$ Pa at about 4° C. over a range of strain values of about 0.01% to about 10%.

Some embodiments of the edible textured insect protein have low peroxide values and reduced rancidity in comparison to known insect protein products. For example, in some embodiments, the edible textured insect protein product has a peroxide value of less than about 10 meq/kg. In some embodiments, the edible textured insect protein product has a peroxide value in a range of about 3 to about 10 meq/kg. In some embodiments, the edible textured insect protein product has a peroxide value of less than about 10 meq/kg and a storage modulus of at least about $10^4$ Pa over a temperature of about 4° C. to about 40° C.

In some embodiments, the edible textured insect protein product substantially absent of exogenous gelling agents, which, for the purposes of the present specification are ingredients that are not native to the at least one insect. Exogenous gelling agents may include starches, added proteins including vegetable, dairy, or meat proteins, or hydrocolloids like carrageenan, pectin, agar agar, alginate, carboxymethylcellulose, gelatin, gum Arabic, cellulose gum, or guar gum. For example, in some embodiments, the edible textured insect protein product is at least about 95% absent of exogenous gelling agents. In some embodiments, the edible textured insect protein product does not contain any exogenous gelling agents.

In some embodiments, the edible textured insect protein product has a protein content greater than about 10%. In some embodiments, the edible textured insect protein product has a protein content greater than about 18%. In some embodiments, the edible textured protein product has a protein content of about 21% and is fortified with about 20% pea protein isolate.

In some embodiments, the edible insect flours described herein are comprised of a milled insoluble fraction of at least one insect (also referred to herein as a milled insoluble insect fraction) and have a crude protein content of about 61%. In some embodiments, the edible insect flours described herein are comprised of a milled insoluble fraction of at least one insect and have a crude protein content of about 62%.

In some embodiments, the edible insect whey protein concentrate described herein has a soluble protein content of greater than about 39%. In some embodiments, the edible insect whey protein concentrate has a soluble protein content of greater than about 35%. In some embodiments, the edible insect whey protein concentrate has a protein content of about 30% and a fat content of less than about 2%. In some embodiments, the edible insect whey protein concentrate has a protein content greater than about 30%. In some related embodiments, the edible insect whey protein concentrate is also in powder form.

In some embodiments, the edible insect whey protein concentrate described herein is generally non-turbid when suspended in water. In some embodiments, the edible insect whey protein concentrate is generally non-turbid when suspended in water and in powder form. In some embodiments, the edible insect whey protein concentrate is generally non-turbid when suspended in water and in a concentration of up to about 15%. In some related embodiments, the edible insect whey protein concentrate is in powder form.

In some embodiments, the edible insect protein concentrate described herein has a soluble protein content greater than about 35% and comprises high hydrostatic pressure treated insect milk. In some embodiments, the edible insect protein concentrate has a protein content greater than about 30% and comprises high hydrostatic pressure treated insect milk. In some embodiments, the edible insect protein concentrate has a protein content greater than about 50% and comprises high hydrostatic pressure treated insect milk. In some embodiments, the edible insect protein concentrate having a protein solubility greater than 35% and comprises high hydrostatic pressure treated insect milk.

In some embodiments, the edible insect protein concentrate described herein has a soluble protein content greater than about 35% and comprises enzyme treated insect milk. In some embodiments, the edible insect protein concentrate has a protein content greater than about 30% and the edible insect protein concentrate comprises enzyme treated insect milk. In some embodiments, the edible insect protein concentrate has a protein content greater than about 50% and comprises enzyme treated insect milk. In some embodiments, the edible insect protein concentrate has a protein solubility greater than about 35% and comprises enzyme treated insect milk.

The application is illustrated with non-limiting examples.

EXAMPLE 1

Coarse Textured Mealworm or Cricket Protein

Live mealworms or crickets were frozen until dead in a freezer set to about −20° C. Mealworms or crickets were removed from the freezer and about 10 kg of mealworms or crickets were weighed and washed in cold, potable water, such as municipal, distilled or deionized water, to remove any soilant on the mealworm exteriors. The washed mealworms or crickets were then set aside.

An extraction buffer solution was prepared using 20 L of cold, potable water containing about 15 g of ascorbic acid, about 15 g of citric acid, about 200 g of calcium chloride, and about 150 g of sodium chloride. The extraction buffer solution pH was adjusted to about pH 12 (at about 15° C.) using a 6 M sodium hydroxide solution.

About ten (10) kg of mealworms or crickets were mixed with about 20 L of the prepared extraction buffer solution in a steam kettle and comminuted with an immersion blender until completely ground. About 7 mL of rosemary oil (Herbalox® NS from Kalsec®) was added to the insect milk and mixed with the immersion blender.

The insect milk pH was then adjusted to about 7 using 6 M sodium hydroxide. The insect milk was then heated rapidly in a steam kettle to a temperature of at least 95° C. The insect milk was gently stirred during heating to prevent scorching, but not too vigorously to disrupt protein networking. Proteins began to coagulate between 45 and 70° C. When the insect milk reached about 95° C., it was held at or above this temperature for at least about 2 minutes to inactivate enzymes that may cause discoloration and to inactivate microorganisms. The coagulation was complete and the insect milk had separated into a coagulum, "curd" and unturbid "whey".

The coagulated insect milk was poured into a cloth lined basket to separate the curds and whey. The whey was collected and reserved until needed. The curds were transferred to a mold and pressed using a weight to achieve a pressure of at least about 0.5 psi maintained for about 25 minutes. Whey removed from the curds during pressing was also collected and added to the whey collected when the curd/whey mixture was filtered. The curd, hereto referred to as or coarse textured cricket or mealworm protein, was then cut, portioned, and packaged. When made from crickets or mealworms, the curd was found to have a protein content of 18.26% and 18.96%, respectively. Nutritional parameters are presented in Table 1 below. When made from crickets or mealworms, approximately 10 and 8 kg of TIP was produced, respectively.

TABLE 1

Nutritional Information for Coarse Mealworm and Cricket TIP

| Nutritional Parameter | Units | Coarse Cricket TIP | Coarse Mealworm TIP |
| --- | --- | --- | --- |
| Moisture | g/100 g | 65.1 | 67.9 |
| Protein | g/100 g | 18.26 | 18.96 |
| Ash | g/100 g | 2.1 | 2.9 |
| Fat | g/100 g | 10.3 | 6.55 |
| Saturated Fatty Acids | g/100 g | 3.98 | 1.47 |
| cis-Monounsaturated Fatty Acids | g/100 g | 2.39 | 2.22 |
| cis-Polyunsaturated Fatty Acids | g/100 g | 3.39 | 2.5 |
| Trans-Fatty Acids | g/100 g | 0.096 | 0.029 |

TABLE 1-continued

Nutritional Information for Coarse Mealworm and Cricket TIP

| Nutritional Parameter | Units | Coarse Cricket TIP | Coarse Mealworm TIP |
| --- | --- | --- | --- |
| Carbohydrates | g/100 g | 4.3 | 3.7 |
| Omega-3 Polyunsaturated Fatty Acids | g/100 g | 0.153 | 0.102 |
| Omega-6 Polyunsaturated Fatty Acids | g/100 g | 3.24 | 2.4 |
| Total Dietary Fibre | g/100 g | 2.5 | 2.6 |
| Total Sugars | g/100 g | <0.4 | <0.4 |
| Cholesterol | mg/100 g | 86 | 74 |
| Beta Carotene | µg/100 g | 12 | 164 |
| Vitamin C | mg/100 g | 0.7 | <0.5 |
| Vitamin B12 | µg/100 g | 5 | 0.7 |
| Calcium | µg/g | 4700 | 7100 |
| Iron | µg/g | 18 | 15 |
| Potassium | µg/g | 920 | 960 |
| Sodium | µg/g | 2300 | 2400 |

Whey produced in this example had a total solids content of about 6%. The whey was transferred to an evaporator and concentrated to about 25% total solids. It was then spray dried at an inlet temperature of about 200° C., outlet temperature of about 100° C. The insect whey protein concentrate (IWPC) was highly soluble in water. When made from mealworms the IWPC had a moisture content of about 13.5%, a protein content of about 34% and a fat content of about 0.5% as shown in Table 2. Approximately 800 g of IWPC was produced in this example when made from crickets or mealworms.

TABLE 2

Mealworm serum protein concentrate proximate composition

| Component | Units | Mealworm IWPC |
| --- | --- | --- |
| Moisture | g/100 g | 13.5 |
| Dry Matter | g/100 g | 86.5 |
| Crude Protein | g/100 g | 33.8 |
| Crude Fat | g/100 g | 0.5 |
| Ash | g/100 g | 39.5 |
| Calcium | g/100 g | 1.44 |
| Phosphorus | g/100 g | 0.41 |
| Magnesium | g/100 g | 0.24 |
| Potassium | g/100 g | 2.52 |
| Sodium | g/100 g | 8.741 |
| Iron | ppm | 55 |
| Zinc | ppm | 239 |
| Copper | ppm | 18 |
| Manganese | ppm | 10 |
| Molybdenum | ppm | 0.9 |
| Sulfur | g/100 g | 0.23 |

EXAMPLE 2

Coarse Textured, Pea Protein Fortified Mealworm or Cricket Protein

Live mealworms or crickets were frozen until dead in a freezer set to about −20° C. Mealworms or crickets were removed from the freezer and about 10 kg of mealworms or crickets were weighed and washed in cold, potable water, such as municipal, distilled or deionized water, to remove any soilant on the mealworm exteriors. The washed mealworms or crickets were then set aside.

An extracting buffer solution was prepared using about 20 L of cold, potable water containing about 15 g of ascorbic acid, about 15 g of citric acid, about 200 g of calcium chloride, and about 150 g of sodium chloride. The buffer solution pH was adjusted to about pH 12 (at about 15° C.) using a 6 M sodium hydroxide solution.

Ten (10) kg of mealworms or crickets were mixed with about 20 L of the prepared buffer solution in a steam kettle and comminuted with an immersion blender until completely ground. About 7 mL of rosemary oil (Herbalox® NS from Kalsec®) was added to the insect milk and mixed with the immersion blender.

About 2 kg of pea protein isolate (PPI) powder (minimum protein content: 80%, purchased from Caldic® Canada Inc.) was added to the insect milk and mixed with an immersion blender until thoroughly dispersed.

The insect milk pH was then adjusted to about 7 using 6 M sodium hydroxide. The insect milk was then heated rapidly in a steam kettle to a temperature of at least about 95° C. The insect milk was gently stirred during heating to prevent scorching, but not too vigorously to disrupt protein networking. Proteins began to coagulate between about 45 and about 70° C. When the insect milk reached about 95° C., it was held at or above this temperature for at least 2 minutes to inactivate enzymes that may cause discoloration. The coagulation was complete and the insect milk had separated into a coagulum, "curd" and unturbid "whey".

The coagulated insect milk was poured into a cloth lined basket to separate the curds and whey. The whey was collected and reserved until needed. The curds were transferred to a mold and pressed using a weight to achieve a pressure of at least about 0.5 psi maintained for about 25 minutes. Whey removed from the curds during pressing was also collected and added to the whey collected when the curd/whey mixture was filtered. The curd, hereto referred to as or coarse textured cricket or mealworm protein, was then cut, portioned, and packaged. When made from crickets or mealworms and fortified with about 20% PPI, the curd was found to have a protein content of about 21.21% and about 22.61%, respectively. Nutritional parameters are presented in Table 3 below. When made from crickets or mealworms, approximately 15 and 12.5 kg of pea protein fortified TIP was produced, respectively.

TABLE 3

Protein and fat content of PPI fortified, coarse cricket and mealworm TIP

| Component | Units | Coarse Cricket TIP (fortified with 20% PPI) | Coarse Mealworm TIP (fortified with 20% PPI) |
|---|---|---|---|
| Crude Protein | g/100 g | 21.21 | 22.61 |
| Crude Fat | g/100 g | 4.48 | 5.59 |

EXAMPLE 3

Fine Textured Mealworm or Cricket Protein

Live crickets, mealworms, or black soldier fly larva (BSFL) were frozen until dead in a freezer set to about −20° C. Crickets, mealworms, or BSFL were removed from the freezer and about 10 kg of crickets, mealworms, or BSFL were weighed and washed in cold, potable water, such as municipal, distilled or deionized water, to remove any soilant on the crickets, mealworms, or BSFL exteriors. The washed crickets, mealworms, or BSFL were then set aside.

An extracting buffer solution was prepared using about 20 L of cold, potable water containing about 15 g of ascorbic acid, about 15 g of citric acid, about 200 g of calcium chloride, and about 150 g of sodium chloride. The buffer solution pH was adjusted to about pH 12 (at about 15° C.) using a 6 M sodium hydroxide solution.

Ten (10) kg of crickets, mealworms, or BSFL were mixed with about 20 L of the prepared buffer solution and ground in a blender on a medium to low setting (a Vitamix Turboblend VS® blender at setting 4) for about 1 minute. The ground mixture was filtered through a 500 micron screen. The filtrate (also referred to herein as filtered insect milk) was collected into a bucket and kept cold until required. The retentate (also referred to herein as the insoluble fraction), containing the mealworm chitin fraction, was rinsed in at least 2 times its weight of cold, potable water to neutralize pH and remove traces of salts. The chitin fraction was transferred to parchment paper lined trays and dried using in a convection oven at about 250° F. for about 3 hours or until the moisture content was below about 5%. Nutritional compositions of insect flour produced in this example from mealworms or BSFL are presented in Table 4 below. Insect flour produced in this example from crickets are presented in Table 5 below. When made from crickets or mealworms approximately 1.5 kg of insect flour was produced.

TABLE 4

Mealworm and BSFL flour proximate nutritional composition

| Component | Units | Mealworm Flour | BSFL Flour |
|---|---|---|---|
| Moisture | g/100 g | 5.2 | 6 |
| Dry Matter | g/100 g | 94.8 | 94 |
| Crude Protein | g/100 g | 61.6 | 61 |
| Soluble Protein | % of crude protein | 34 | 19 |
| Crude Fat | g/100 g | 16.3 | 4.2 |
| Ash | g/100 g | 6.69 | 12.07 |
| Calcium | g/100 g | 0.03 | 2.5 |
| Phosphorus | g/100 g | 0.55 | 0.65 |
| Magnesium | g/100 g | 0.13 | 0.24 |
| Potassium | g/100 g | 0.59 | 0.59 |
| Sodium | g/100 g | 1.415 | 1.287 |
| Iron | ppm | 27 | 97 |
| Zinc | ppm | 100 | 93 |
| Copper | ppm | 11 | 32 |
| Manganese | ppm | 10 | 247 |
| Molybdenum | ppm | 0.7 | 0.7 |
| Sulfur | g/100 g | 0.39 | 0.39 |

TABLE 5

Nutritional composition of cricket flour

| Nutritional Parameter | Units | Cricket flour |
|---|---|---|
| Moisture | g/100 g | 3.4 |
| Protein | g/100 g | 62.48 |
| Ash | g/100 g | 4.2 |
| Fat | g/100 g | 17.5 |
| Saturated Fatty Acids | g/100 g | 6.05 |
| cis-Monounsaturated Fatty Acids | g/100 g | 3.27 |
| cis-Polyunsaturated Fatty Acids | g/100 g | 7.26 |
| Trans-Fatty Acids | g/100 g | 0.165 |
| Carbohydrates | g/100 g | 12.4 |
| Omega-3 Polyunsaturated Fatty Acids | g/100 g | 0.541 |
| Omega-6 Polyunsaturated Fatty Acids | g/100 g | 6.72 |
| Total Dietary Fibre | g/100 g | 10.4 |
| Total Sugars | g/100 g | <0.4 |
| Cholesterol | mg/100 g | 229 |
| Beta Carotene | µg/100 g | 21 |
| Vitamin C | mg/100 g | 0.5 |
| Vitamin B12 | µg/100 g | 14 |
| Calcium | µg/g | 1500 |
| Iron | µg/g | 31 |
| Potassium | µg/g | 5400 |
| Sodium | µg/g | 3700 |

Approximately 20 kg of filtered insect milk was produced in this example. About 7 mL of rosemary oil (Herbalox® NS from Kalsec®) was added to the filtered insect milk as an antioxidant and the pH was adjusted to about 7 using 6 M sodium hydroxide. The filtered insect milk was transferred to a steam kettle and heated rapidly to a temperature of at least about 95° C. The filtered insect milk was gently stirred during heating to prevent scorching, but not too vigorously to disrupt protein networking. Proteins began to coagulate at between about 45° C. and about 65° C. When the filtered insect milk reached about 95° C., it was held at or above this temperature for at least about 2 minutes to inactivate enzymes that cause discoloration. The coagulation was complete and the filtered insect milk had separated into a coagulum, "curd" and unturbid "whey".

The coagulated filtered insect milk was poured into a cloth lined basket to separate the curds and whey. The whey was collected and reserved until needed. The curds were transferred to a mold and pressed using a weight to achieve a pressure of at least about 0.5 psi maintained for about 25 minutes. Whey removed from the curds during pressing was also collected and added to the whey collected when the curd/whey mixture was filtered.

The curd was portioned and packaged. The curds made from mealworms or crickets had a high storage modulus in the range of about 10^5 Pa, as exhibited in the non-limiting example in FIGS. 9A & 9B, which indicates the formation of a firm gel structure. High gel firmness is a desirable sensory characteristic which may give the product textural characteristics similar to meat products or dairy-based spreads. Gel firmness in the curd may be reduced at increased temperatures, but remained at a relatively firm level (between about 10^4 and about 10^5 Pa) at temperatures up to about 40° C. as exhibited in the non-limiting example depicted in FIGS. 9D & 9E, indicating the product may retain its texture in the consumer's mouth.

As described in this non-limiting example, proximate composition for the curd produced from mealworms and BSFL (hereto referred to as "fine TIP") are given in Table 6. Protein and fat contents for fine cricket TIP produced according to this method are presented in Table 7. When made from crickets, mealworms, or BSFL approximately 4 kg of TIP was produced.

TABLE 6

Fine Mealworm and BSFL TIP proximate compositions

| Component | Units | Fine Mealworm TIP | Fine BSFL TIP |
| --- | --- | --- | --- |
| Moisture | g/100 g | 66.4 | 70.8 |
| Dry Matter | g/100 g | 33.6 | 29.2 |
| Crude Protein | g/100 g | 13 | 10.4 |
| Soluble Protein | % of crude protein | 12 | 13 |
| Crude Fat | g/100 g | 13.7 | 6.5 |
| Ash | g/100 g | 5.16 | 8.29 |
| Calcium | g/100 g | 1.3 | 2.42 |
| Phosphorus | g/100 g | 0.78 | 0.75 |
| Magnesium | g/100 g | 0.05 | 0.14 |
| Potassium | g/100 g | 0.12 | 0.12 |
| Sodium | g/100 g | 0.36 | 0.287 |
| Iron | ppm | 13 | 99 |
| Zinc | ppm | 18 | 82 |
| Copper | ppm | 3 | 24 |
| Manganese | ppm | 1 | 230 |
| Molybdenum | ppm | 0.3 | <0.1 |
| Sulfur | g/100 g | 0.13 | 0.19 |

TABLE 7

Protein and fat content for fine cricket TIP

| Component | Units | Fine Cricket TIP |
| --- | --- | --- |
| Crude Protein | g/100 g | 16.62 |
| Crude Fat | g/100 g | 6.73 |

TIP was evaluated for peroxide value to determine the effectiveness of the antioxidant to prevent lipid peroxidation. Peroxide value results for fine mealworm and fine cricket TIP are presented in Table 8 below.

TABLE 8

Peroxide value fine cricket and fine mealworm TIP

| Component | Units | Fine Cricket TIP | Fine Mealworm TIP |
| --- | --- | --- | --- |
| Peroxide value | meq/kg | 8.5 | 3.5 |

Whey produced in this example had a total solids content of about 6%. The whey was transferred to an evaporator and concentrated to about 25% total solids. It was then spray dried at an inlet temperature of 200° C., outlet temperature of 100° C.

EXAMPLE 4

High Pressure Treated Insect Protein Concentrate

Live crickets or mealworms were frozen until dead in a freezer set to about −20° C. Crickets or mealworms were removed from the freezer and about 10 kg of mealworms were weighed, set aside, and washed in cold, potable water, such as municipal, distilled or deionized water, to remove any soilant on the insect exteriors. The washed insects were set aside. Insects were then placed in 1 gallon vacuum seal bags and vacuum sealed.

Packaged insects were pressure treated in a hydrostatic pressure retort at about 450 MPa for about 15 minutes with an initial water temperature of about 4° C. After processing, insects were unloaded from the retort and stored in a freezer until required.

An extraction buffer solution was prepared using about 20 L of cold, potable water containing about 15 g of ascorbic acid and about 15 g of citric acid.

Ten (10) kg of crickets or mealworms were mixed with about 20 L of the buffer solution in a steam kettle and comminuted using an immersion blender until completely ground. The ground mixture was filtered through a 100 micron screen. The filtered high hydrostatic pressure insect milk was collected and kept cold until required. The retentate contained the insoluble insect fraction and was rinsed with at least 2 times its weight in cold, potable water to neutralize pH and remove traces of salts. The cricket or mealworm chitin fraction was transferred to parchment paper lined trays and dried in a convection oven at about 250° F. for about 3 hours or until the moisture content was about less than about 5%. When made from crickets or mealworms approximately 1.5 kg of insect flour was produced.

Approximately 20 kg of filtered high hydrostatic pressure insect milk was produced in this example. The filtered high hydrostatic pressure insect milk was heated to boiling to pasteurize the high hydrostatic pressure treated insect milk.

The treated milk was boiled for about 4 hours until the solids content increased from about 9% to about 21%.

The concentrated, high hydrostatic pressure treated insect milk was reserved for further processing and stored under refrigeration or frozen until required. The concentrated high hydrostatic pressure treated insect milk was later removed from the refrigerator and allowed to warm to about 50° C. The concentrated milk was then spray dried at about 165° C. inlet temperature and about 85° C. outlet temperature yielding cricket or mealworm insect protein concentrate power. Approximately 2 kg of powder was produced by this method. This powder was found to have a high solubility and a protein content of about 52 to about 55%. The powder was also found to be readily dispersible in water and to not precipitate in an environment with a pH in a range of 2 to about 7.

EXAMPLE 5

Enzyme Treated Insect Protein Concentrate

Live crickets or mealworms were frozen until dead in a freezer set to about −20° C. Crickets or mealworms were removed from the freezer and about 10 kg of crickets or mealworms were weighed, set aside, and washed in cold, potable water, such as municipal, distilled or deionized water, to remove any soilant on the insect exteriors. The washed insects were set aside.

An extraction buffer solution was prepared using about 20 L of cold, potable water containing about 15 g of ascorbic acid and about 15 g of citric acid.

About ten (10) kg of crickets or mealworms were mixed with about 20 L of the buffer solution in a steam kettle and comminuted using an immersion blender until completely ground. The insect milk was filtered through a 100 micron screen. The filtered insect milk was collected and kept cold until required. The retentate contained the insoluble insect fraction and was rinsed with at least 2 times its weight in cold, potable water to neutralize pH and remove traces of salts. The cricket or mealworm chitin fraction was transferred to parchment paper lined trays and dried in a convection oven at about 250° F. for about 3 hours or until the moisture content was about less than about 5%. When made from crickets or mealworms approximately 1.5 kg of insect flour was produced.

Approximately 20 kg of filtered insect milk was produced in this example. The filtered insect milk pH was adjusted to about 7 using 6 M sodium hydroxide. The pH was measured using a pH-meter with built in automatic temperature correction to account for the filtered insect milk temperature. The filtered insect milk was warmed while stirring to about 50° C., this temperature was maintained using a waterbath. About two-hundred (200) mL of FoodPro PD® by Danisco® (commercial subtilisin) was added to the filtered insect milk and stirred for about 30 seconds to disperse the enzyme. The enzyme treated insect milk was maintained at a temperature of about 50° C. for about 25 minutes after which it was heated to boiling to pasteurize the enzyme treated milk. The enzyme treated milk was boiled for about 4 hours until the solids content increased from about 9% to about 21%.

The concentrated, enzyme treated insect milk was reserved for further processing and stored under refrigeration or frozen until required. The concentrated enzyme treated insect milk was later removed from the refrigerator and allowed to warm to about 50° C. The concentrated enzyme treated insect milk was then spray dried at 165° C. inlet and 85° C. outlet yielding cricket or mealworm insect enzyme treated protein concentrate powder. Approximately 2 kg of enzyme treated protein concentrate powder was produced in this example. The enzyme treated protein concentrate powder was also found to be readily dispersible in water and to not precipitate in an environment with a pH in a range of about 2 to about 7. Nutritional proximates for an example insect protein concentrate made from crickets is presented in Table 9 below.

TABLE 9

Nutritional proximates for Cricket Insect Protein Concentrate

| Component | Units | Cricket IPC |
|---|---|---|
| Moisture | g/100 g | 9.3 |
| Dry Matter | g/100 g | 90.7 |
| Crude Protein | g/100 g | 52 |
| Soluble Protein | % of crude protein | 97 |
| Crude Fat | g/100 g | 14 |
| Ash | g/100 g | 19.88 |
| Calcium | g/100 g | 0.13 |
| Phosphorus | g/100 g | 1.15 |
| Magnesium | g/100 g | 0.08 |
| Potassium | g/100 g | 1.28 |
| Sodium | g/100 g | 5.43 |
| Iron | ppm | 40 |
| Zinc | ppm | 114 |
| Copper | ppm | 39 |
| Manganese | ppm | 12 |
| Molybdenum | ppm | 0.1 |
| Sulfur | g/100 g | 1.22 |

Persons skilled in the art will appreciate that there are yet more alternative embodiments and modifications possible, and that the above examples are only illustrations of one or more embodiments. The scope, therefore, is only to be limited by the claims appended hereto.

What is claimed is:

1. A process for producing at least one edible protein product derived from at least one insect, the process comprising:
    processing the at least one insect to produce an insect milk by
        combining the at least one insect with an extraction buffer solution containing at least one of a monovalent salt, a divalent salt and a phosphate salt, and
        reducing the at least one insect into a plurality of insect particles of a desired particle size;
    adjusting the pH level of the insect milk; and
    heating the insect milk to coagulate the insect milk to form whey and at least one curd;
    wherein the extraction buffer solution contains the divalent salt at a concentration of about 0.25 to about 2%.

2. An edible textured insect protein product produced according to a process comprising the process of claim 1, wherein the edible textured insect protein product is substantially absent of exogenous gelling agents.

3. An edible textured insect protein product produced according to a process comprising the process of claim 1, wherein the edible textured insect protein product has a storage modulus of at least about 10,000 Pascals over a temperature of about 4° C. to about 40° C.

4. An edible textured insect protein product produced according to a process comprising the process of claim 1, wherein the edible textured insect protein product has a protein content greater than 10%.

5. An edible insect whey protein concentrate according to a process comprising the process of claim 1, having a protein content greater than about 30%.

6. The process of claim 1 further comprising:
adding at least one of a bulking agent, a protein concentrate, a protein isolate, an antioxidant and a gelling agent to the insect milk.

7. The process of claim 1 further comprising:
prior to the adjusting of the pH level, separating the insect milk into at least one of a fat fraction and a liquid fraction.

8. The process of claim 1, wherein after the adjusting the pH level, the adjusted pH level of the insect milk is in the range of about 5 to about 9, or about 6.5 to about 7.1, or about 8 to about 9.

9. The process of claim 1, wherein the extraction buffer solution contains the monovalent salt at a concentration of about 0.25 to about 2%.

10. The process of claim 1, wherein the monovalent salt is one of sodium chloride and potassium chloride.

11. The process of claim 1, wherein the divalent salt is one of calcium chloride, magnesium chloride, magnesium sulfate, calcium sulfate, calcium lactate and magnesium lactate.

12. The process of claim 1, wherein the extraction buffer solution is one of acidic or alkaline.

13. The process of claim 1 further comprising:
prior to the heating, filtering the insect milk to remove an insoluble fraction from the insect milk, wherein the insoluble fraction comprises chitin from the at least one insect.

14. The process of claim 1 further comprising:
applying an expelling pressure to the at least one curd to expel additional whey from the at least one curd.

15. The process of claim 1 further comprising:
after the heating, filtering the insect milk to separate the whey from the at least one curd.

16. The process of claim 1 further comprising:
drying the insect whey protein concentrate to produce an insect whey protein concentrate powder.

17. The process of claim 1, wherein the heating comprises heating the insect milk to a temperature of about 60° C. to 100° C.

* * * * *